(12) United States Patent
Vaughn-Spickers et al.

(10) Patent No.: US 7,122,227 B2
(45) Date of Patent: *Oct. 17, 2006

(54) CHIRAL PHOTOISOMERIZABLE COMPOUNDS

(75) Inventors: Julian Vaughn-Spickers, Southampton (GB); Simon Greenfield, Dorset (GB); Ian Victor Edward Hassall, Dorset (GB); Christopher Dunn, Southampton (GB); Richard Harding, Hants (GB); Tony Jenkins, Hampshire (GB); Alison May, Dorset (GB)

(73) Assignee: Merck Patent Gesellschaft, Darmstadt (DE)

( * ) Notice: Subject to any disclaimer, the term of this patent is extended or adjusted under 35 U.S.C. 154(b) by 297 days.

This patent is subject to a terminal disclaimer.

(21) Appl. No.: 10/432,015

(22) PCT Filed: Sep. 21, 2001

(86) PCT No.: PCT/EP01/10944

§ 371 (c)(1),
(2), (4) Date: May 19, 2003

(87) PCT Pub. No.: WO02/40614

PCT Pub. Date: May 23, 2002

(65) Prior Publication Data

US 2004/0026660 A1    Feb. 12, 2004

(30) Foreign Application Priority Data

Nov. 20, 2000 (EP) ................... 00124365

(51) Int. Cl.
C09K 19/38 (2006.01)
C09K 19/52 (2006.01)
C09K 19/58 (2006.01)
C07C 69/76 (2006.01)

(52) U.S. Cl. .............. 428/1.1; 252/299.01; 252/299.2; 252/299.61; 252/299.62; 252/299.63; 252/299.64; 252/299.65; 252/299.66; 252/299.67; 560/76; 560/85

(58) Field of Classification Search ........... 252/299.01, 252/299.6, 299.7, 299.61, 299.62, 299.63, 252/299.66, 299.67, 299.2, 299.64, 299.65; 428/1.1; 349/175, 176, 179, 180, 185; 560/76, 560/85

See application file for complete search history.

(56) References Cited

U.S. PATENT DOCUMENTS 6,319,963 B1 * 11/2001 Coates et al. ............ 522/1
6,495,217 B1 * 12/2002 Farrand ..................... 428/1.1
6,511,719 B1 * 1/2003 Farrand ..................... 428/1.1
6,680,003 B1 * 1/2004 Chuard et al. ............ 252/299.2
6,905,739 B1 * 6/2005 Cherkaoui et al. ........ 428/1.1
6,953,611 B1 * 10/2005 Hammond-Smith et al. . 428/1.3

FOREIGN PATENT DOCUMENTS

GB    2328207       2/1999
JP    08-020641    * 1/1996

OTHER PUBLICATIONS

Yun, Y-K; Ko, D-H; Jin, J-I; Kang, Y.S.; Zin, W-C; Jo, B-W. "Synthesis and Characterization fo New Chiral Side Chain Liquid Crystalline Polyoxetanes", Macromolecules 2000, 33, 6653-6663 (web published Aug. 10, 2000).*
Hattori, H.; Uryu, T., "Photochromic chiral liquid crystalline systems containing spiro-oxazine with a chiral substituent I. Synthesis and characterization of compounds", Liquid Crystals, 2001, vol. 28, No. 1, pp. 25-34.*
Ritter, O.M.S; Merlo, A.A.; Pereira, F.V.; Da Silveira, N.P.; Geissler, E.; Zukerman-Schpector, J. "Synthesis and characterization of new chiral liquid crystalline polyacrylates from L-isoleucine", Liquid Crystals, 2002, No. 9, 1187-1200.*
English translation of Yusuke et al.*
K. Yokota et al., "Chirality induction in cyclopolymerization XI. Bulkiness effect of 1,2-diol templateson cyclopolymerations of bis(4-vinylbenzoate)s with styrene," Polymer Journal, 1999, pp. 1037-1040, vol. 31, No. 11-2, XP001053658, Scheme 1, Compound 1e.
S. M. Kelly et al., "Four-unit linking groups V. optically active dopants," Liquid Crystals, 1992, pp. 761-771, vol. 11, No. 5, XP002192313, table 3.
Witte Van De P et al., "Modification of the pitch of chiral nematic liquid crystals by means of photoisomerization of chiral dopants," Liquid Crystals, Jun. 1, 1998, pp. 819-827, vol. 24, No. 6, XP000773004, ISSN: 0267-8292, cited in the application, the whole document, Taylor and Francis Ltd, London, GB.
Deussenn H-J et al., "New 6,-6-disubstituted-binaphthol derivatives as chiral dopants: Synthesis and temperature dependence of molecular conformations," Liquid Crystals, Sep. 1, 1996, p. 327-340, vol. 21, No. 3, XP000629493, ISSN: 0267-8292, cited in the application, the whole document, Taylor and Francis Ltd, London, GB.

* cited by examiner

Primary Examiner—Shean C Wu
(74) Attorney, Agent, or Firm—Millen, White, Zelano & Branigan, P.C.

(57) ABSTRACT

The invention relates to chiral photoisomerizable compounds of formula (I) wherein $X^1$, $X^2$, $X^3$, $X^4$, $X^5$ and $X^6$ have the meanings given in claim 1, to liquid crystalline mixtures and polymers containing them, and to the use of chiral photoisomerizable compounds, liquid crystalline mixtures and polymers containing them in optical and electrooptical devices like liquid crystal displays or projection systems, in optical elements like polarizers, retardation films, compensators, color filters or holographic elements, in liquid crystal pigments and colored films or coatings for decorative or security applications, cosmetic and pharmaceutical compositions, in nonlinear optics and optical information storage.

23 Claims, 1 Drawing Sheet

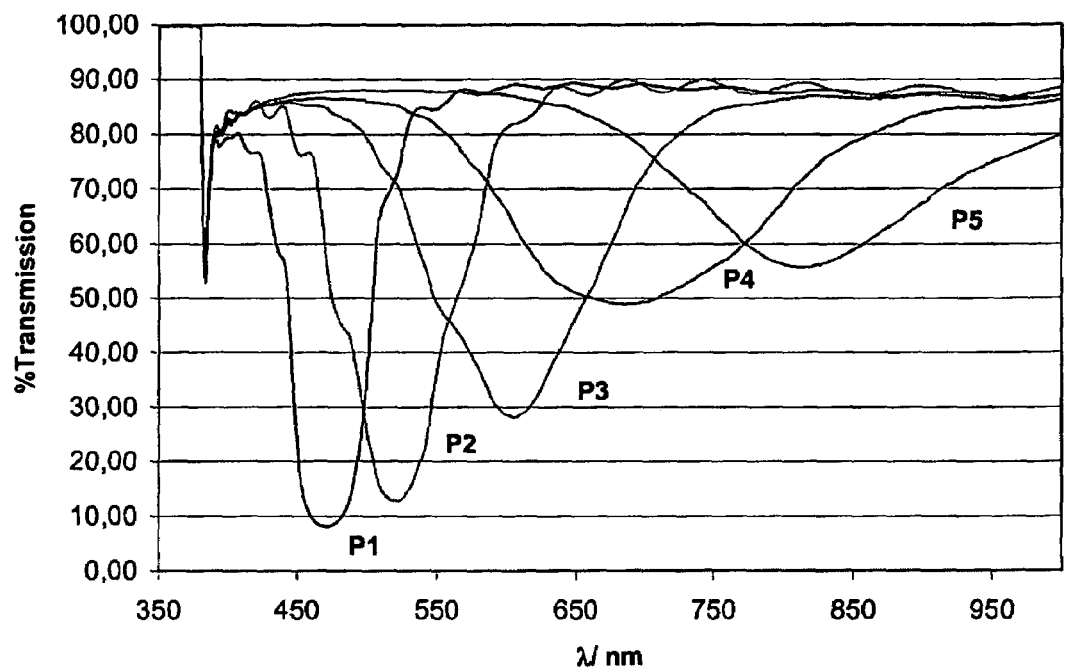
Figure 1
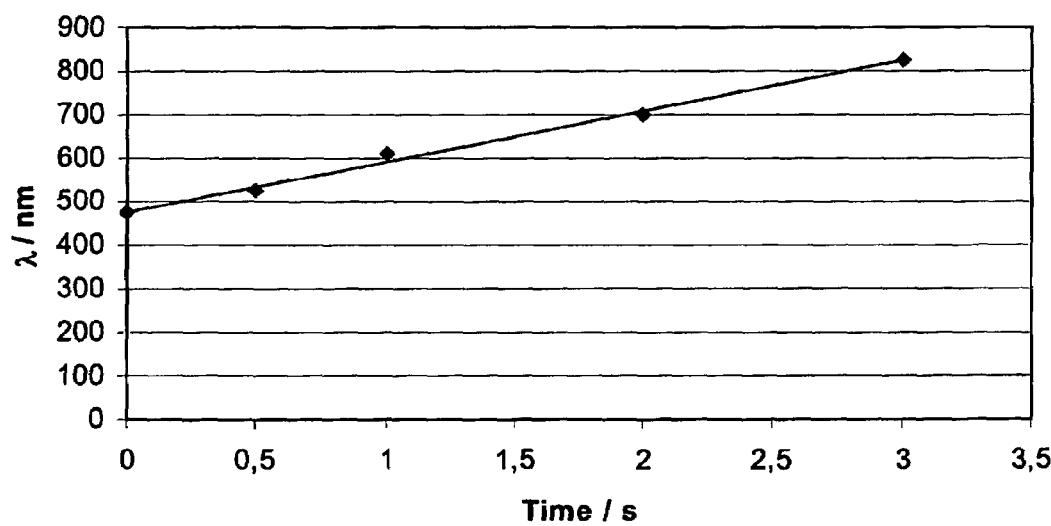
Figur 2

CHIRAL PHOTOISOMERIZABLE COMPOUNDS

FIELD OF THE INVENTION

The invention relates to chiral photoisomerizable compounds, to liquid crystalline mixtures and polymers containing them, and to the use of these chiral photoisomerizable compounds, mixtures and polymers in optical and electrooptical devices like liquid crystal displays or projection systems, optical elements like polarizers, retardation films, compensators, colour filters or holographic elements, in adhesives, synthetic resins with anisotropic mechanical properties, cosmetic and pharmaceutical compositions, diagnostics, liquid crystal pigments, for decorative and security applications, in nonlinear optics, optical information storage or as chiral dopants.

BACKGROUND AND PRIOR ART

Chiral materials which change their chirality upon photoirradiation are known in prior art. For example, photoisomerizable chiral materials were reported which show E-Z or cis-trans isomerization upon photoirradiation and are thereby converted from one chiral form into another chiral form. Further known are photodegradable or (photo)tunable chiral materials (TCM) that change from chiral to achiral or to a racemic mixture upon photoirradiation, due to destruction of their chirality by photoelimination or photocleavage of the chiral center.

Photoisomerizable chiral materials have been suggested inter alia for the preparation of cholesteric polymer films with patterned optical properties, which can be used as optical components like colour filters or broadband reflective polarizers in liquid crystal displays. The preparation of patterned cholesteric films is described for example in WO 00/34808.

Furthermore, photoisomerizable and phototunable chiral materials have been suggested for use in cholesteric or multi-domain liquid crystal displays.

For example, WO 98/57223 discloses a multi-domain liquid crystal display with a nematic liquid crystal material comprising a polymerizable menthone derivative as photoisomerizable chiral dopant. The display comprises different sub-pixels in which the twist sense of the liquid crystal material is mutually opposite. It is manufactured by photoirradiation of a layer of liquid crystalline material containing a photoisomerizable chiral dopant with a given twist sense and a non-isomerizable chiral dopant with opposite twist sense through a photomask. This causes the isomerizable dopant in the exposed parts of the layer to change its chirality, leading to a change of the helical pitch in the exposed parts.

U.S. Pat. No. 5,668,614 discloses a multicolour cholesteric display made from a cholesteric liquid crystal mixture comprising a tunable chiral material (TCM). The display is prepared by partially exposing the liquid crystal mixture with the TCM to photoirradiation through a photomask. This leads to a change of the chirality of the TCM by photocleavage or photoracemisation and thus to a change of the helical pitch in the exposed parts of the cholesteric liquid crystal material. Thereby regions with different pitch and thus different colours of the reflected wavelength are obtained and a multicolour display is realized.

Photoisomerizable chiral materials comprising menthone, camphor or nopinone derivatives or chiral stilbenes have been reported by P. van de Witte et al., Liq. Cryst. 24 (1998), 819–27, J. Mat. Chem. 9 (1999), 2087–94 and Liq. Cryst. 27 (2000), 929–33 and A. Bobrovski et al., Liq. Cryst. 25 (1998), 679–687.

Tunable chiral materials (TCMs) comprising a photocleavable carboxylic acid group or aromatic keto group attached to the chiral center are disclosed in U.S. Pat. No. 5,668,614. Furthermore, F. Vicentini, J. Cho and L. Chien, Liq. Cryst. 24 (1998), 483–488 describe binaphthol derivatives as TCMs and their use in multicolour cholesteric displays.

However, the isomerizable and tunable chiral materials of prior art have several drawbacks. The TCMs reported in U.S. Pat. No. 5,668,614 and by F. Vicentini et al. have the general disadvantage that photocleavage is an irreversible process and leads to destruction of the chiral compound. The photoisomerizable menthone and stilbene derivatives disclosed in in WO 98/57223 and the articles of P. van de Witte et al. and A. Bobrovsky et al. have the disadvantage that they are not easily structurally modified due to a lack of functionality.

Another drawback of many photoisomerizable compounds known from prior art is that they exhibit only a low helical twisting power (HTP). The HTP describes the effectiveness of a chiral compound to induce a helically twisted molecular structure in a liquid crystal host material, and is given in first approximation, which is sufficient for most practical applications, by equation (1):

$$HTP = \frac{1}{p \cdot c} \qquad (1)$$

wherein c is the concentration of the chiral compound and p is the helical pitch. As can be seen from equation (1), a short pitch can be achieved by using a high amount of the chiral compound or by using a chiral compound with a high absolute value of the HTP. Thus, in case chiral compounds with low HTP are used, high amounts are needed to induce a short pitch. This is disadvantageous, because chiral compounds often negatively affect the properties of the liquid crystalline host mixture, like for example the clearing point, the dielectric anisotropy $\Delta\epsilon$, the viscosity, the driving voltage or the switching times, and because chiral compounds can be used only as pure enantiomers and are therefore expensive and difficult to synthesize.

Another disadvantage of chiral compounds of prior art is that they often show low solubility in the liquid crystal host mixture, which leads to undesired crystallization at low temperatures. To overcome this disadvantage, typically two or more different chiral compounds have to be added to the host mixture. This implies higher costs and also requires additional effort for temperature compensation of the mixture, as the different chiral compounds usually have to be selected such that their temperature coefficients of the twist compensate each other.

Therefore, there is a considerable demand for chiral photoisomerizable compounds with a high HTP which are easy to synthesize in a large range of derivatives, can be used in low amounts, show improved temperature stability of the cholesteric pitch e.g. for utilizing a constant reflection wavelength, do not affect the properties of the liquid crystalline host mixture and show good solubility in the host mixture.

The invention has the aim of providing chiral photoisomerizable compounds having these properties, but not having the disadvantages of the chiral compounds of prior art as discussed above. Another aim of the invention is to extend the pool of chiral photoisomerizable compounds available to the expert.

It has been found that the above aims can be achieved by providing photoisomerizable chiral compounds according to claim 1.

Definition of Terms

The terms 'liquid crystalline or mesogenic material' or 'liquid crystalline or mesogenic compound' should denote materials or compounds comprising one or more rod-shaped, lath-shaped or disk-shaped mesogenic groups, i.e. groups with the ability to induce liquid crystal phase behaviour. Rod-shaped and lath-shaped mesogenic groups are especially preferred. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'helically twisted structure' refers to anisotropic materials, like for example liquid crystal materials, that exhibit a chiral mesophase wherein the mesogens are oriented with their main molecular axis twisted around a helix axis, like e.g. a chiral nematic (=cholesteric) or a chiral smectic phase. Materials exhibiting a cholesteric phase or chiral smectic C phase are preferred. Particularly preferred are materials exhibiting a cholesteric phase.

The term 'film' includes self-supporting, i.e. free-standing, films that show more or less pronounced mechanical stability and flexibility, as well as coatings or layers on a supporting substrate or between two substrates.

The term "photoisomerizable group" means a group that shows isomerization, for example cis-trans or E-Z isomerization, imparting a change in shape upon photoirradiation with a suitable wavelength, preferably in the range from 250 to 400 nm, very preferably from 300 to 400 nm.

BRIEF DESCRIPTION OF THE DRAWINGS

FIG. 1 depicts the reflection spectrum of polymer films P1–P5 according to example 10, prepared by polymerizing a mixture comprising an inventive photoisomerizable compound after photoisomerization for different periods of time.

FIG. 2 depicts the central wavelength of reflection of films P1–P5 versus photoisomerization time.

SUMMARY OF THE INVENTION

One object of the invention are chiral photoisomerizable compounds of formula I

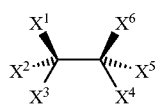

I wherein
$X^1$, $X^2$, $X^3$, $X^4$, $X^5$ and $X^6$ independently of each other denote H, straight chain or branched alkyl with 1 to 20 C atoms wherein one or more $CH_2$ groups can also be replaced by —O—, —S—, —CO—, —NR$^0$—, —CH=CH—, or —C≡C— in such a manner that O and/or S atoms are not linked directly to one another and wherein one or more H-atoms can also be replaced by F or Cl, or denote an aliphatic or aromatic carbocyclic or heterocyclic group with 3 to 40 C atoms that may also comprise fused and/or substituted rings, or two of $X^1$, $X^2$, $X^3$, $X^4$, $X^5$ and $X^6$ may also together form a cyclic group with up to 40 C atoms,
with the provisos that $X^1 \neq X^2 \neq X^3$ and $X^4 \neq X^5 \neq X^6$, and that the compound comprises at least one photoisomerizable group and at least one mesogenic group, or at least one group that is photoisomerizable and mesogenic.

Another object of the invention is a liquid crystalline mixture containing at least one compound of formula I.

Another object of the present invention is a polymerizable liquid crystalline mixture comprising at least two compounds, at least one of which is a compound of formula I and at least one of which is a polymerizable compound.

Another object of the invention is a chiral linear or crosslinked anisotropic polymer obtainable by polymerizing a polymerizable liquid crystalline mixture comprising one or more compounds of formula I.

Another object of the invention is the use of a chiral compound, mixture or polymer as described above in optical and electrooptical devices like liquid crystal displays or projection systems, such as STN, TN, AMD-TN, temperature compensation, ferroelectric, guest-host, phase change or surface stabilized or polymer stabilized cholesteric texture (SSCT, PSCT) displays, in optical elements, like reflective polarizers, retardation films, compensators, colour filters or holographic elements, especially in reflective films with patterned optical properties, in adhesives, synthetic resins with anisotropic mechanical properties, cosmetic and pharmaceutical compositions, diagnostics, liquid crystal pigments, for decorative and security applications, especially in security markings that are applied to items or documents of value for easy identification or prevention of falsification, in nonlinear optics, optical recording or information storage, or as chiral dopants.

Another object of the invention is an anisotropic polymer film comprising a compound of formula I.

Another object of the invention is a reflective polymer film with patterned optical properties comprising a compound of formula I, in particular a cholesteric polymer film having different regions with different reflection wavelength.

Another object of the invention is a broadband reflective polarizer or colour filter comprising a compound of formula I.

Another object of the invention is a liquid crystal display comprising a liquid crystalline mixture or a polymerizable liquid crystalline mixture comprising at least one chiral compound of formula I.

Another object of the invention is a liquid crystal display comprising an optical component, in particular a broadband reflective polarizer or colour filter, comprising a compound of formula I.

DETAILED DESCRIPTION OF THE INVENTION

The inventive chiral photoisomerizable compounds are mesogenic or liquid crystalline, i.e. they can induce or enhance mesophase behaviour for example in a mixture with other compounds or exhibit one or more mesophases themselves. It is also possible that the inventive compounds show mesophase behaviour only in mixtures with other compounds, or, in case of polymerizable compounds, when being (co)polymerized. Mesogenic inventive compounds are especially preferred.

The inventive compounds have several advantages they can easily be synthesized, also on large scale of several hundred grams, with a broad range of derivatives using standard methods that are known from the literature, the starting materials can be obtained commercially or synthesized cheaply using methods known from the literature they can be prepared enantiomerically pure as compounds of different handedness (left handed and right handed), enabling both left and right handed helices to be formed in a nematic host, the availability of both helices is a considerable advantage, e.g. for the use in security applications, as it enables the production of chiral films or coatings reflecting circularly polarized light of a single handedness, they exhibit a high HTP, they exhibit a good solubility in liquid crystalline mixtures, they exhibit broad liquid crystalline phases, when inventive compounds are used as chiral dopant in a liquid crystalline mixture, due to their high solubility higher amounts of dopant can be used to produce a high twist (=a low pitch), in case high amounts of dopants are needed, due to the broad liquid crystalline phases of the inventive dopants the liquid crystal phase of the host mixture is less negatively influenced, due to their high HTP, lower amounts of inventive dopants are needed to achieve a high pitch, and thereby the liquid crystalline properties of the mixture are less negatively affected, liquid crystalline mixtures comprising one or more inventive dopants show a considerably improved low temperature stability, nematic liquid crystalline mixtures comprising one or more inventive dopants show a reduced temperature dependence of the threshold voltage when used in electrically switchable displays, Preferably the compounds of formula I comprise one or more polymerizable groups.

Particularly preferred are compounds of formula I, wherein $X^1$, $X^2$, $X^3$, $X^4$, $X^5$ and $X^6$ are selected from a) H or straight chain or branched alkyl with 1 to 20 C atoms wherein one or more $CH_2$ groups can also be replaced by —O—, —S—, —CO—, —$NR^0$—, —CH=CH—, —C≡C— in such a manner that O and/or S atoms are not linked directly to one another and wherein one or more H-atoms can also be replaced with F or Cl, b) —B-(Sp)$_n$-G, and c) —B-(Sp)$_n$-($M^1$-$Z^1$)$_i$-(PI)$_k$-($Z^2$-$M^2$)$_i$-R, wherein two of $X^1$, $X^2$, $X^3$, $X^4$, $X^5$ and $X^6$ may also form together a cyclic group with up to 40 C atoms that is optionally substituted with one or more groups R, and $X^1 \neq X^2 \neq X^3$ and $X^4 \neq X^5 \neq X^6$, $R^0$ is H or alkyl with 1 to 4 C atoms, G is an aliphatic or aromatic carbocyclic or heterocyclic group with 3 to 40 C atoms that may also comprise fused rings and may also be substituted with one or more groups R, R is H, halogen, $NO_2$, CN, SCN, $SF_5$, straight chain, branched or cyclic alkyl with 1 to 25 C atoms wherein one or more $CH_2$ groups can also be replaced by —O—, —S—, —CO—, —$NR^0$—, —CH=CH—, —C≡C— in such a manner that O and/or S atoms are not linked directly to one another, and wherein one or more H-atoms can also be replaced by F or Cl, or P-(Sp)$_n$-, P is a polymerizable group, Sp is a spacer group with 1 to 20 C atoms, n is 0 or 1, B is —O—, —S—, —$NR^0$—, —O—CO—, —$NR^0$—CO—, —O—COO—, —$OCH_2$—, —S—CO—, —S—COO— or a single bond, PI is a photoisomerizable group that may in addition be mesogenic, $M^1$ and $M^2$ are independently of each other a mesogenic group, i, k and l are independently of each other 0 or 1, $Z^1$ and $Z^2$ are independently of each other —O—, —S—, —CO—, —COO—, —OCO—, —CO—$NR^0$—, —$NR^0$—CO—, —$CH_2CH_2$—, —$CF_2CF_2$—, —$CH_2CF_2$—, —$OCH_2$—, —$CH_2O$—, —$SCH_2$—, —$CH_2S$—, —$CF_2O$—, —$OCF_2$—, —CH=CH—, —CF=CF—, —CH=CF—, —$(CH_2)_4$—, —CH=CH—COO—, —OCO—CH=CH—, —C≡C— or a single bond, and at least one of $X^1$, $X^2$, $X^3$, $X^4$, $X^5$ and $X^6$ is —B-Sp-($M^1$-$Z^1$)$_i$-(PI)$_k$-($Z^2$—$M^2$)$_i$-G, (PI)$_k$—($Z^2$—$M^2$)$_i$-G, and k in at least one of those groups is 1.

Particularly preferred are compounds of formula I comprising one to six, in particular one to four, very preferably one or two polymerizable groups P.

Further preferred are compounds of formula I comprising one to four, in particular one or two photoisomerizable groups PI.

Further preferred are compounds of formula I wherein $X^1=X^6$, $X^2=X^5$ and $X^3=X^4$ Further preferred are compounds of formula I, wherein one or more, in particular one or two of $X^1$ to $X^6$ are selected from the groups as defined in a). Very preferably these groups are selected from H, alkyl, alkenyl, alkoxy, alkenyloxy, alkylcarbonyl or alkylcarbonyloxy with 1 to 12 C-atoms that is optionally fluorinated, or have one of the meanings of P.

Further preferred are compounds of formula I, wherein one or more, in particular one or two of $X^1$ to $X^6$ are —B-(Sp)$_n$-G, wherein B is a linkage group, Sp a spacer group and G a cyclic group as defined in formula I, and n is 0 or 1. In these compounds B is preferably —O—, —COO—, —O—COO— or a single bond, very preferably —COO— or a single bond, and n is preferably 0.

The cyclic group G is preferably selected from cyclobutane, cyclo-pentane, 3-(1,1,-dimethylcyclopentane), 2-tetrahydrofuran, 1-pyrrolidine, 2-furan, 2-pyrrol, 2-thiophene, 2-oxazole, 2-thiazole, 2-imidazole, 3-pyrrolidin-2-one, cyclohexane, 1-cyclohexene, 2-tetrahydropyran, 1-piperidine, 3-tetrahydrothiopyrane, 4-(1,3-dioxane), 1,4-dioxane, 2-(1,3,-dithiane), 1,4-dithiane, 2-oxathiane, 4-thiomorpholine, 4-morpholine, phenylene, 2-pyridine, 2-pyrimidine, 2-pyrazine, 4-bicyclohexane, 4'-bicyclohexyl-2-ene, 1-cyclohexane-1,4-dione, 1-bicyclo[2,2,2]octylene, 3-cyclohexenone, 3-hexahydro-furo[3,2-b]furan, 2-(1,4-dioxa-spiro

[4.5]decane), 2-naphthalene, 2-decahydronaphthalene, 5-(1,2,3,4-tetrahydronaphthalene, 2-anthracene and 9-phenanthrene.

Particularly preferably one or more of the groups G denote

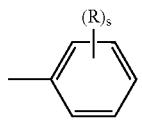

with R having the meaning of formula I and s being 0, 1, 2, 3, 4 or 5.

Further preferred are compounds of formula I wherein one to five, in particular one to four of $X^1$ to $X^6$ denote H, cyclohexyl, phenyl that is optionally substituted with 1 to 4 groups L as defined in formula II, or —(COO)$_o$—S with o being 0 or 1 and S being alkyl with 1 to 4 C atoms.

Further preferred are compounds of formula I wherein two of $X^1$ to $X^6$, in particular the groups $X^1$ and $X^6$ or the groups $X^2$ and $X^5$ or the groups $X^3$ and $X^4$ are H.

Further preferred are compounds wherein two of $X^1$ to $X^6$, in particular the groups $X^1$ and $X^6$ or the groups $X^2$ and $X^5$ or the groups $X^3$ and $X^4$ are cyclohexyl or phenyl that is optionally substituted with 1 or 2 groups L as defined in formula II.

Further preferred are compounds wherein one of $X^1$ to $X^6$ is H and one of $X^1$ to $X^6$ is cyclohexyl, phenyl that is optionally substituted with 1 to 4 groups L as defined in formula II, or —(COO)$_o$—S with o being 0 or 1 and S being alkyl with 1 to 4 C atoms, in particular those wherein one of $X^1$ and $X^6$ or one of $X^2$ and $X^5$ or one of $X^3$ and $X^4$ is H and the other is cyclohexyl, phenyl or —(COO)$_o$—S.

Further preferred are compounds, wherein two of $X^1$, $X^2$, $X^3$, $X^4$, $X^5$ and $X^6$ together form a cyclic group with up to 40 C atoms. Preferred compounds of this type are selected from the following formulae

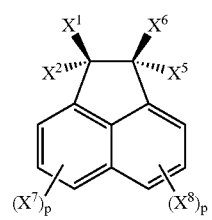

I-1

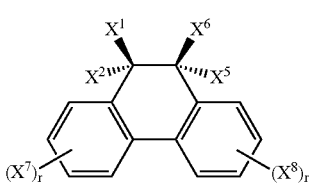

I-2

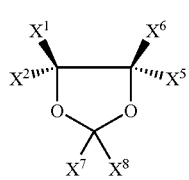

I-3 wherein $X^7$ and $X^8$ are independently of each other halogen, NO$_2$, CN, SCN, SF$_5$, straight chain or branched alkyl with 1 to 25 C atoms wherein one or more CH$_2$ groups can also be replaced by —O—, —S—, —CO—, —NR$^0$—, —CH=CH—, —C≡C— in such a manner that O and/or S atoms are not linked directly to one another, and wherein one or more H-atoms can also be replaced by F or Cl, or denote a cycloalkyl, phenyl, benzyl or fused carbocyclic or heterocyclic aliphatic or aromatic group with up to 25 C atoms that is optionally substituted with one or more groups R as defined in formula I, or P-(Sp)$_n$, p is in each case independently 0, 1, 2 or 3, and r is in each case independently 0, 1, 2, 3 or 4.

In the above formula, two substituents $X^7$ or $X^8$ in neighboured positions on a phenyl ring can also form a fused carbocyclic or heterocyclic aliphatic or aromatic group with up to 25 C atoms, like for example in the following compounds

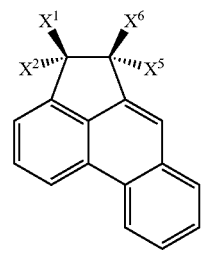

I-1a

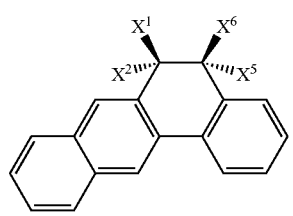

I-2a

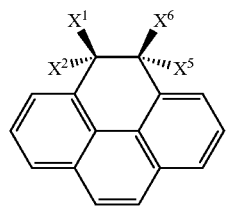

I-2b wherein the aromatic rings may also be mono- or polysubstituted with R as defined in formula I.

Particularly preferred are compounds of formula I wherein one to six, in particular one, two, three or four, very preferably one or two of $X^1$ to $X^6$ denote —B-(Sp)$_n$-(M$^1$-Z$^1$)$_i$-(PI)$_k$-(Z$^2$-M$^2$)$_j$—R. Very preferred compounds of this type are those wherein two of $X^1$ to $X^6$, in particular the groups $X^1$ and $X^6$ or the groups $X^1$ and $X^5$ denote —B-(Sp)$_n$-(M$^1$-Z$^1$)$_i$-(PI)$_k$-(Z$^2$-M$^2$)$_j$—R, especially those wherein the two groups —B—(Sp)$_n$-(M$^1$-Z$^1$)$_i$-(PI)$_k$-(Z$^2$-M$^2$)$_j$—R are identical.

The compounds of formula I comprise at least one mesogenic group, which can be a photoisomerizable group PI that is in addition mesogenic, or a separate mesogenic group $M^1$ or $M^2$.

The mesogenic groups $M^1$ and $M^2$ are preferably of formula II

—$(A^1-Z)_m$-$A^2$-      II wherein $A^1$ and $A^2$ are independently of each other selected from
- A) 1,4-phenylene in which, in addition, one or more CH groups may be replaced by N,
- B) 1,4-cyclohexylene in which, in addition, one or two non-adjacent $CH_2$ groups may be replaced by O and/or S,
- C) 1,3-dioxolane-4,5-diyl, 1,4-cyclohexenylene, piperidine-1,4-diyl, 1,4-bicyclo-(2,2,2)-octylene, naphthalene-2,6-diyl, decahydro-naphthalene-2,6-diyl, 1,2,3,4-tetrahydronaphthalene-2,6-diyl or indane-2,5-diyl, it being possible for all these groups to be unsubstituted, mono- or polysubstituted with L, L is halogen, CN, SCN, $NO_2$, $SF_5$ or an alkyl, alkoxy, alkylcarbonyl or alkoxycarbonyl group with 1 to 4 C atoms, wherein one or more H atoms may be substituted with F or Cl, Z has in each case independently one of the meanings of $Z^1$ in formula I, and m is 0, 1, 2 or 3.

Alternatively $A^1$ and/or $A^2$ can have one of the above meanings of G.

The mesogenic groups $M^1$ and/or $M^2$ preferably incorporate two or three five- or six-membered rings.

A smaller group of preferred mesogenic groups of formula II is listed below. For reasons of simplicity, Phe in these groups is 1,4-phenylene that may also be substituted with 1 to 4 groups L as defined in formula II, Cyc is 1,4-cyclohexylene and Z has one of the meanings of formula II. The list is comprising the following subformulae as well as their mirror images

| | |
|---|---|
| -Phe- | II-1 |
| -Cyc- | II-2 |
| -Phe-Z-Phe- | II-3 |
| -Phe-Z-Cyc- | II-4 |
| -Cyc-Z-Cyc- | II-5 |
| -Phe-Phe-Z-Phe- | II-6 |
| -Phe-Z-Phe-Z-Cyc- | II-7 |
| -Phe-Z-Cyc-Z-Phe- | II-8 |
| -Cyc-Z-Phe-Z-Cyc- | II-9 |
| -Phe-Z-Cyc-Z-Cyc- | II-10 |
| -Cyc-Z-Cyc-Z-Cyc- | II-11 |

Particularly preferred are the subformulae II-1, II-2, II-3, II-4, II-5, II-7 and II-10.

Z is preferably —COO—, —OCO—, —$CH_2CH_2$— or a single bond.

Very preferably the mesogenic groups $M^1$ and $M^2$ are selected from the following formulae and their mirror images

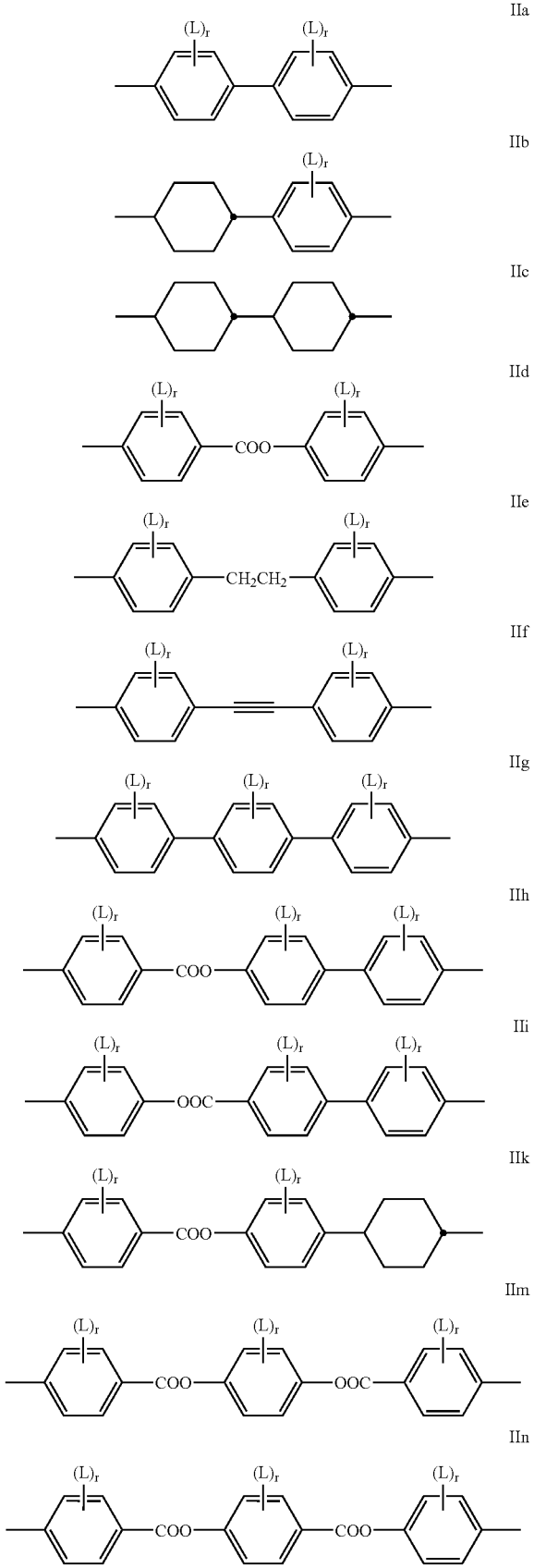

-continued

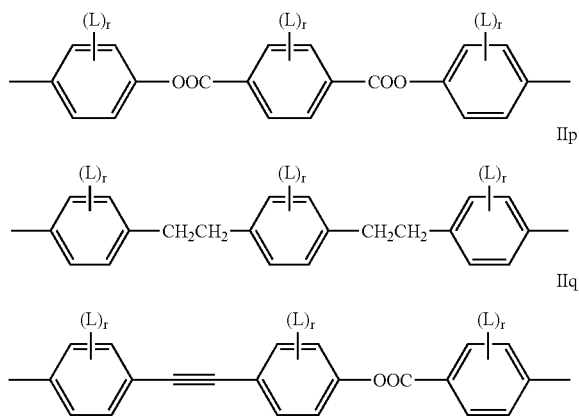

wherein L and r have the above meanings, and r is preferably 0, 1 or 2.

The group

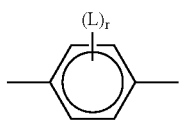

in these preferred formulae is very preferably denoting

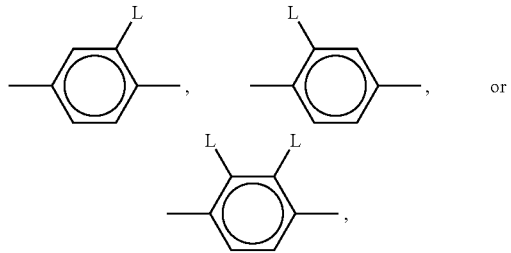

furthermore

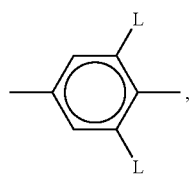

with L having each independently one of the meanings given above.

Particularly preferred are the subformulae IId, IIg, IIh, IIi, IIk and IIo, in particular the subformulae IId and IIk.

L is preferably F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, in particular F, Cl, CN, CH$_3$, C$_2$H$_5$, OCH$_3$, COCH$_3$, CF$_3$ or OCF$_3$, most preferably F, Cl, CH$_3$, OCH$_3$ or OCF$_3$.

The compounds of formula I comprise at least one photoisomerizable group PI. The photoisomerizable group PI can be every group that is known to the skilled in the art for this purpose, as for example disclosed in John C. Coyle, "Introduction to Organo Photochemistry" 1986, John Wiley ans Sons, Chichester, UK.

Preferably the photoisomerizable group PI is of formula III

wherein

D$^1$ and D$^2$ are independently of each other CH or N or a saturated C atom in a carbocyclic or heterocyclic 5- or 6-membered ring, and C$^1$ and C$^2$ are independently of each other a bivalent aliphatic or aromatic carbocyclic or heterocyclic group with 3 to 40 C atoms that may also comprise fused rings, C$^1$ and D$^1$ or C$^2$ and D$^2$ may also together form a 5- or 6-membered carbocycle or heterocycle, and C$^1$ may also denote a single bond.

Preferably C$^1$ and C$^2$ have independently of each other one of the meanings of A$^1$ as defined in formula II, and D$^1$ and D$^2$ are independently of each other CH or N. Further preferred are compounds wherein C$^1$ is a single bond.

Very preferably D$^1$ and D$^2$ denote CH. Further preferred are compounds wherein D$^1$ and D$^2$ denote N.

Particularly preferably PI is selected from the following formulae

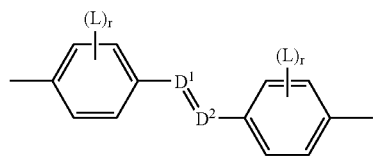

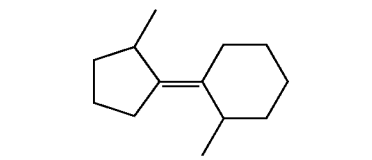

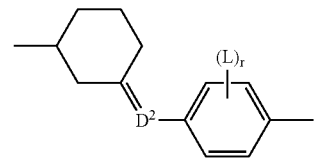

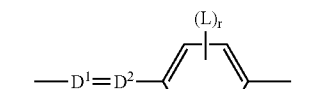

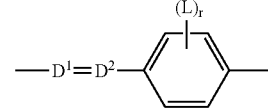

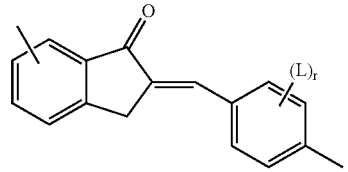

wherein D$^1$ and D$^2$ are CH or N, L has the meaning of formula II, and r has the meaning given above.

Particularly preferred are groups IIId, especially those wherein $D^1$ and $D^2$ are CH.

Particularly preferred are compounds of formula I comprising at least one, preferably one or two groups —B-(Sp)$_n$-(M$^1$-Z$^1$)$_i$-(PI)$_k$-(Z$^2$-M$^2$)$_i$—R, wherein B is —OCO—, n and i are 0, k is 1 and PI is of formula IIId, so that the rest —B-(Sp)$_n$-(M$^1$-Z$^1$)$_i$-(PI)$_k$- forms a cinnamate group.

Further preferred are compounds of formula I, wherein PI is of formula III and C$^1$ and/or C$^2$ are a mesogenic group of formula II. In case these compounds comprise additional mesogenic groups M$^1$ or M$^2$, these may be the same or different as C$^1$ and/or C$^2$.

Particularly preferred are compounds of the following subformulae

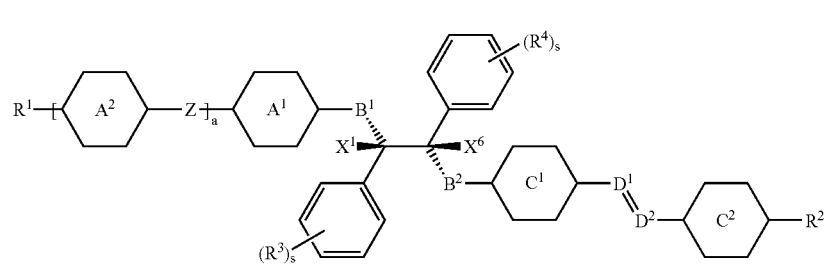

Ia

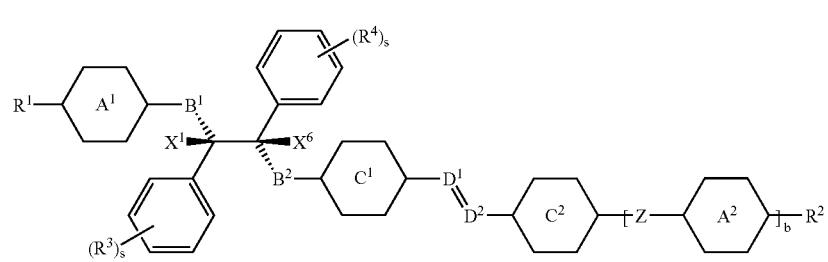

Ib

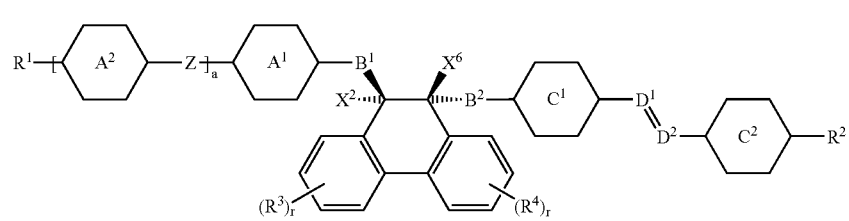

Ic

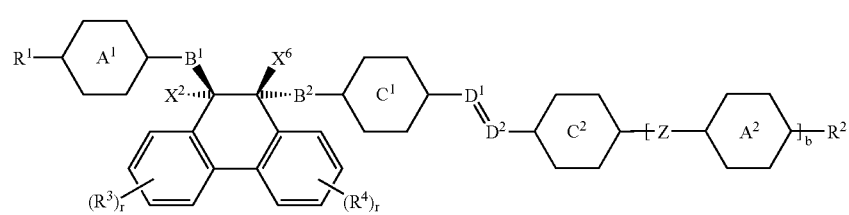

Id

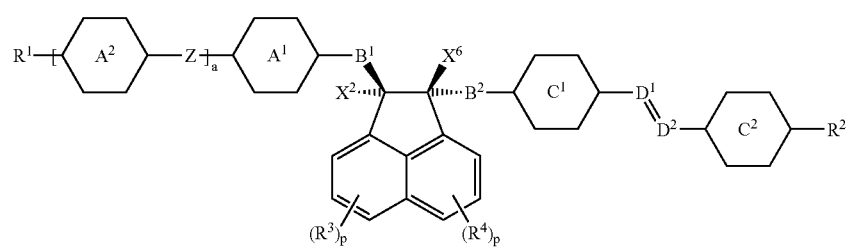

Ie

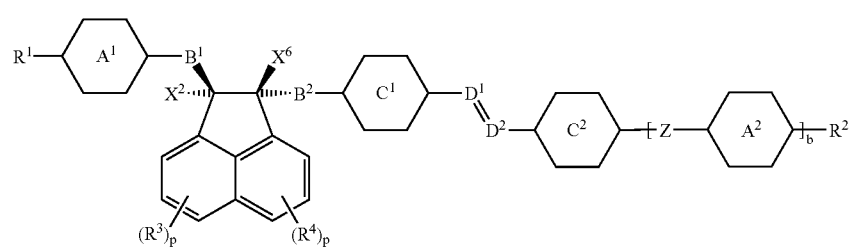

If

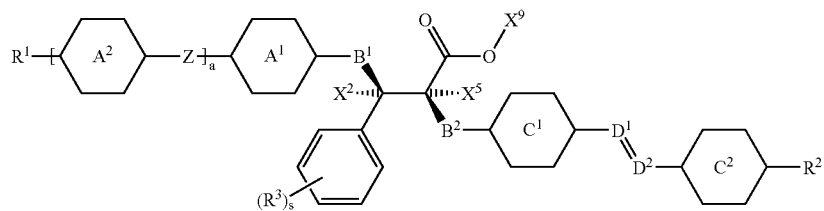
Ig
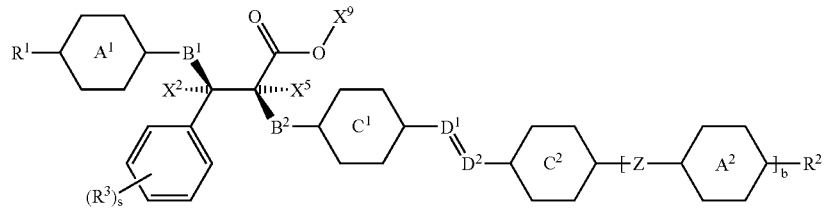
Ih
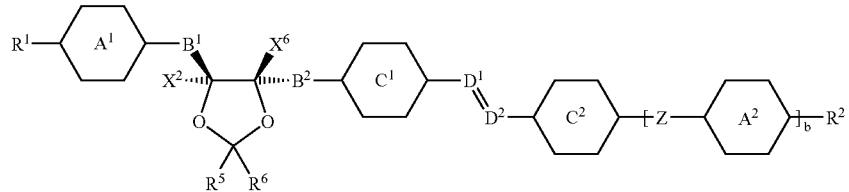
Ii
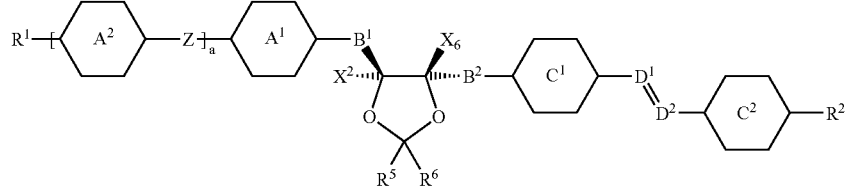
Ik
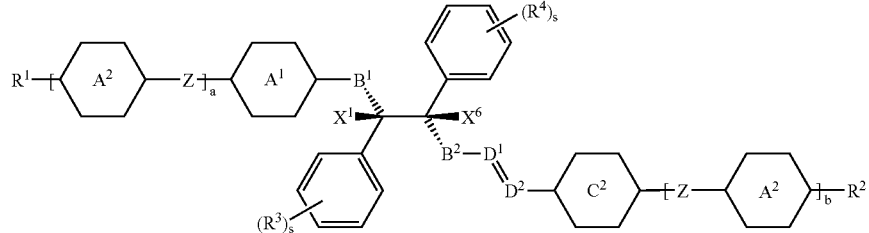
Im
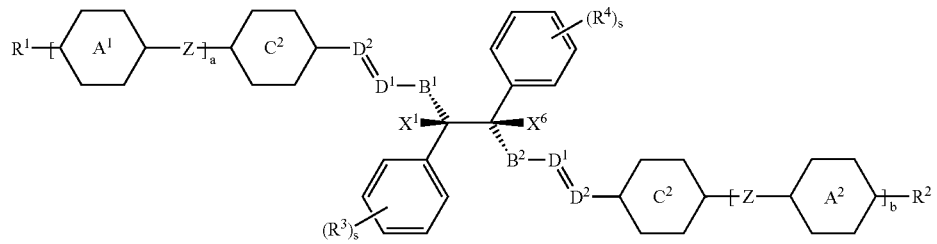
In
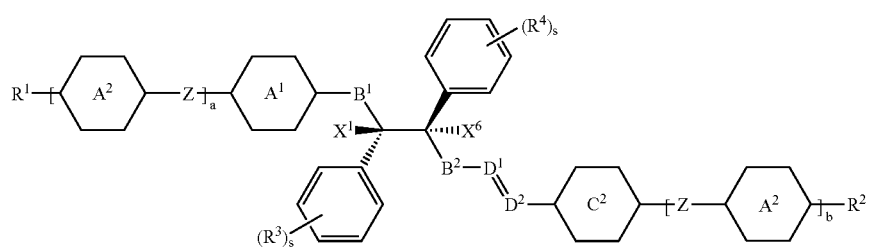
Io

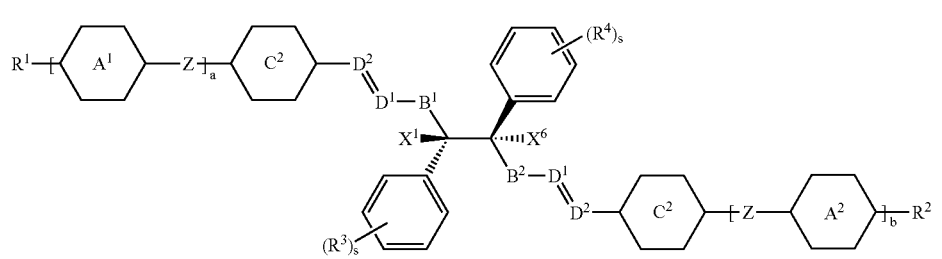

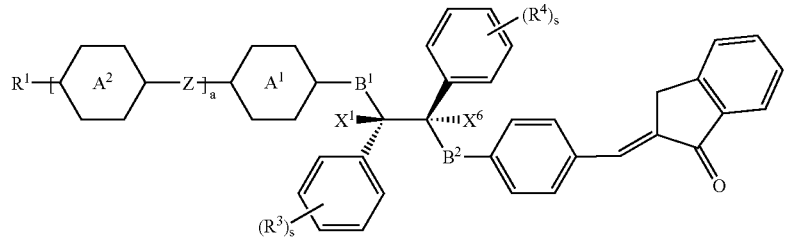

wherein

has one of the meanings of $A^{1,2}$ in formula II and

has one of the meanings $C^{1,2}$ in formula III, and

and

are preferably selected from groups A) and B) of formula II, $X^1$, $X^2$, $X^6$, Z, $D^1$, $D^2$, p, r and s have one of the meanings given above, $B^1$ and $B^2$ have independently of each other one of the meanings of B given above, $R^1$, $R^2$, $R^3$, $R^4$, $R^5$ and $R^6$ have independently of each other one of the meanings of R given above, $X^9$ is straight chain or branched alkyl with 1 to 25 C atoms wherein one or more $CH_2$ groups can also be replaced by —O—, —S—, —CO—, —$NR^0$—, —CH=CH—, —C≡C— in such a manner that O and/or S atoms are not linked directly to one another, and wherein one or more H-atoms can also be replaced by F or Cl, or denotes a cycloalkyl, phenyl, benzyl or fused carbocyclic or heterocyclic aliphatic or aromatic group with up to 25 C atoms that is optionally substituted with one or more groups R or L as defined in formula I, or P-$(Sp)_n$, a is 0, 1, 2 or 3, and b is 0, 1 or 2.

Particularly preferred are compounds of subformulae Ia to In wherein $A^1$ and $A^2$ are cyclohexyl or phenyl that may also be substituted with one to four, preferably one or two groups L as defined above, Z is —COO—, —OCO—, —$CH_2CH_2$— or a single bond, $C^1$ and $C^2$ are cyclohexyl or phenyl that may also be substituted with one to four, preferably one or two groups L as defined above, $D^1$ and $D^2$ are CH, $X^1$ and $X^2$ are H, $B^1$ is COO and $B^2$ is OCO, $R^1$ and $R^2$ are F, Cl, CN, alkyl or alkoxy with 1 to 10 C atoms, or P-$(Sp)_n$— one or both of $R^1$ and $R^2$ denote P-$(Sp)_n$-, $R^3$ and $R^4$ have of the meanings of L given above or denote P-$(Sp)_n$-, and preferably are F, Cl, CN or optionally fluorinated alkyl or alkoxy with 1 to 3 C atoms, p, r and s are each independently 0, 1 or 2, $R^5$ and $R^6$ are alkyl or alkoxy with 1 to 4 C atoms or denote P-$(Sp)_n$-, and preferably are methyl, ethyl or propyl, $X^9$ is straight chain, branched or cyclic alkyl or alkyloxy with 1 to 12 C atoms, or phenyl that is optionally substituted with one, two or three groups L as defined above, a is 0 or 1, b is 1.

Very preferred are compounds of the following subformulae

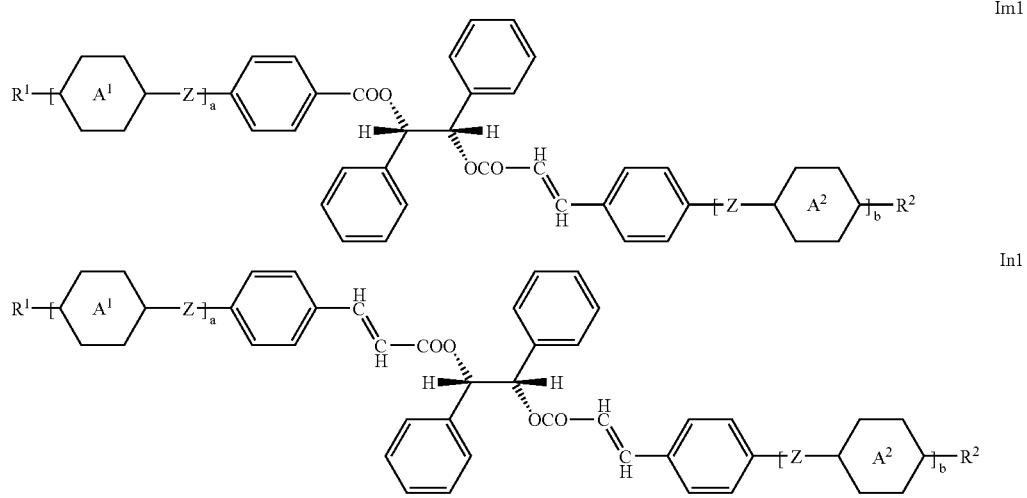

wherein $R^1$, $R^2$, Z, $A^1$, $A^2$, a and b have the meanings given above, in particular those wherein a and b are 0 and $R^1$ and $R^2$ are P-Sp.

If R in formula I is an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Especially preferred is straight chain alkyl or alkoxy with 1 to 8 C atoms.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8-, or 9-oxadecyl, for example.

R in formula I can be a polar or an unpolar group.

In case of a polar group, it is preferably selected from CN, $NO_2$, halogen, $OCH_3$, SCN, $COR^8$, $COOR^8$ or a mono- oligo- or polyfluorinated alkyl or alkoxy group with 1 to 4 C atoms. $R^8$ is optionally fluorinated alkyl with 1 to 4, preferably 1 to 3 C atoms. Especially preferably polar groups are selected of F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular of F, Cl, CN, $OCH_3$ and $OCF_3$.

In case of an unpolar group, it is preferably alkyl with up to 15 C atoms or alkoxy with 2 to 15 C atoms.

R in formula I can be an achiral or a chiral group. In case of a chiral group it is preferably selected according to formula IV:

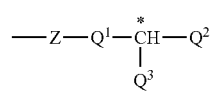

IV wherein
$Z^3$ is —O—, —S—, —CO—, —COO—, —OCO—, —OCOO— or a single bond,
$Q^1$ is an alkylene or alkylene-oxy group with 1 to 9 C atoms or a single bond,
$Q^2$ is an alkyl or alkoxy group with 1 to 10 C atoms which may be unsubstituted, mono- or polysubstituted with halogen or CN, it being also possible for one or more non-adjacent $CH_2$ groups to be replaced, in each case independently from one another, by —C≡C—, —O—, —S—, —$NR^o$—, —CO—, —COO—, —OCO—, —OCO—O—, —S—CO— or —CO—S— in such a manner that oxygen atoms are not linked directly to one another,
$Q^3$ is halogen, a cyano group or an alkyl or alkoxy group with 1 to 4 C atoms different from $Q^2$.

In case $Q^1$ in formula IV is an alkylene-oxy group, the O atom is preferably adjacent to the chiral C atom.

Preferred chiral groups are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy, for example.

In addition, compounds of formula I containing an achiral branched group R may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

Another preferred embodiment of the present invention relates to compounds of formula I wherein R is denoting P-(Sp)$_n$.

$R^0$ in formula I is preferably H or $CH_3$, in particular H.

The polymerisable group P is preferably selected from $CH_2=CW^1$—COO—

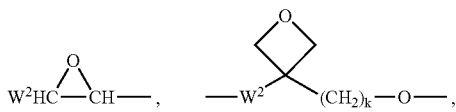

$CH_2=$—O—, $CH_3$—CH=CH—O—, HO—$CW^2W^3$—, HS—$CW^2W^3$—, $HW^2N$—, HO—$CW^2W^3$—NH—, $CH_2=CW^1$—CO—NH—, $CH_2$=CH—(COO)$_{k1}$-Phe-(O)$_{k2}$—, Phe-CH=CH—, HOOC—, OCN— and $W^4W^5W^6Si$—, with $W^1$ being H, Cl, CN, phenyl or alkyl with 1 to 5 C-atoms, in particular H, Cl or $CH_3$, $W^2$ and $W^3$ being independently of each other H or alkyl with 1 to 5 C-atoms, in particular methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

P is particularly preferably an acrylate, methacrylate, vinyl, vinyloxy, epoxy, styrene or propenyl ether group, in particular an acrylate, methacrylate, vinyl or epoxy group.

As spacer group Sp in formula I all groups can be used that are known for this purpose to the skilled in the art. Sp is preferably a straight chain or branched alkylene group having 1 to 20 C atoms, in particular 1 to 12 C atoms, in which, in addition, one or more non-adjacent $CH_2$ groups may be replaced by —O—, —S—, —$NR^0$—, —CO—, —O—CO—, —S—CO—, —O—COO—, —CO—S—, —CO—O—, —CH(halogen)—, —CH(CN)—, —CH(OH)—, —(CF$_2$)$_x$—, —(CD$_2$)$_x$—, —CH=CH—, —CF=CF—, —CH=CF— or —C≡C—, with x being an integer from 1 to 12, and in which one or more H atoms may be replaced by halogen, CN or OH.

Typical spacer groups are for example —(CH$_2$)$_y$—, —(CH$_2$CH$_2$O)$_z$—CH$_2$CH$_2$—, —CH$_2$CH$_2$—S—CH$_2$CH$_2$— or —CH$_2$CH$_2$—NH—CH$_2$CH$_2$—, with y being an integer from 2 to 12 and p being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

Especially preferred are inventive compounds of formula I wherein Sp is denoting alkylene or alkylene-oxy with 2 to 8 C atoms. Straight-chain groups are especially preferred.

In another preferred embodiment of the invention the compounds of formula I comprise at least one spacer group Sp that is a chiral group of formula V:

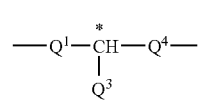

wherein $Q^1$ and $Q^3$ have the meanings given in formula IV, and $Q^4$ is an alkylene or alkylene-oxy group with 1 to 10 C atoms or a single bond, being different from $Q^1$.

In case $Q^1$ in formula V is an alkylene-oxy group, the O atom is preferably adjacent to the chiral C atom.

Throughout this text, halogen is preferably F or Cl.

The inventive chiral compounds can be synthesized according to or in analogy to methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here. Further methods for preparing the inventive compounds can be taken from the examples.

In particular, the inventive compounds can be prepared according to or in analogy to the following reaction schemes.

Scheme 1

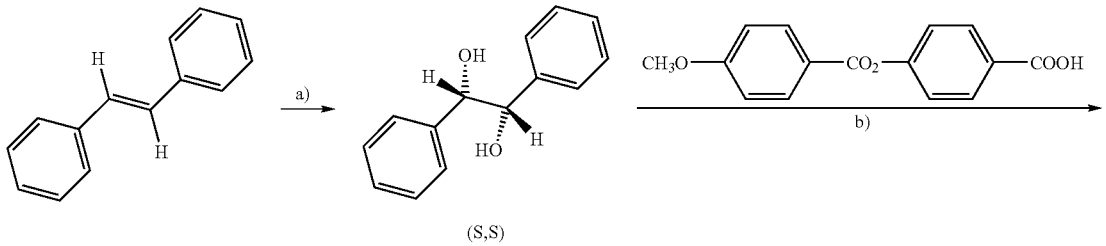

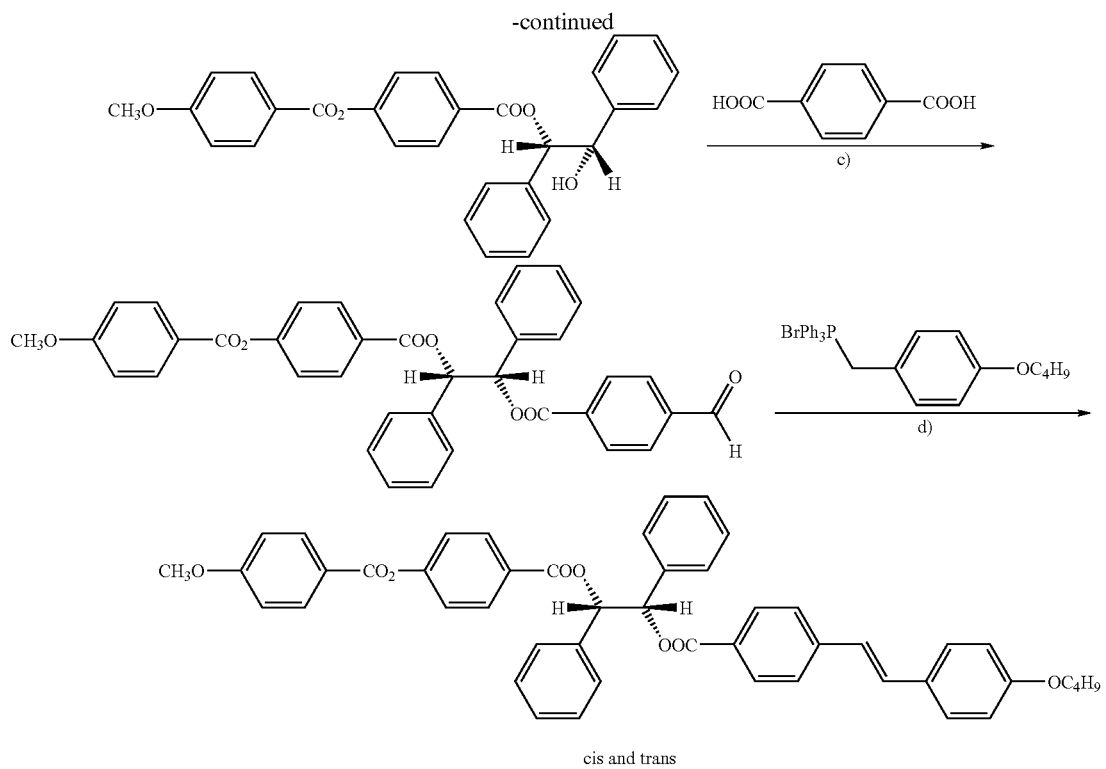
a) (DHQ)$_2$—PHAL, N-methylmorpholine N-oxide, t-butanol, potassium osmate (VI) dihydrate, r.t.; b) DCC, 4-(dimethylamino)-pyridine, DCM, r.t.; c) DCC, 4-(dimethylamino)-pyridine, DCM, r.t.; d) potassium t-butoxide, THF, −5° C.
Scheme 2
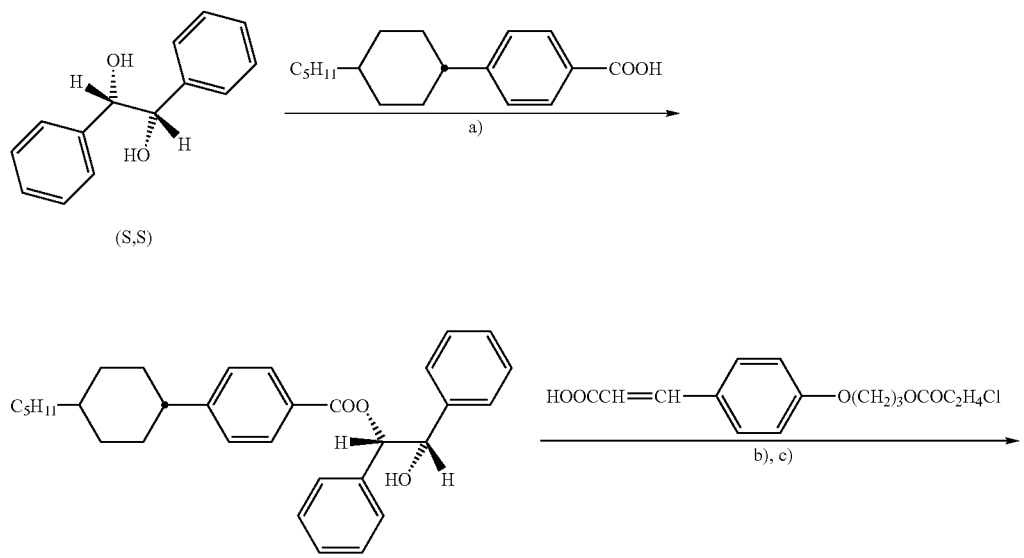

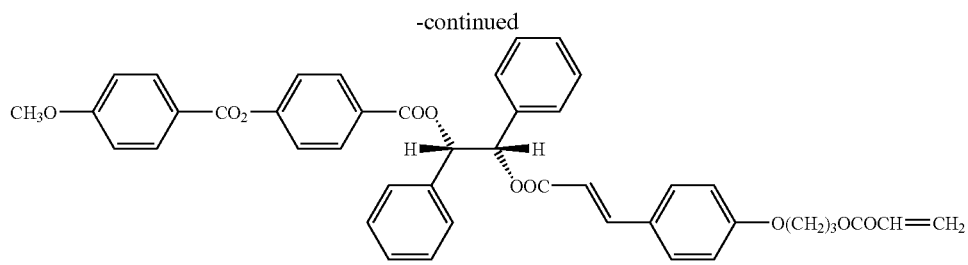

a) DCC, 4-(dimethylamino)-pyridine, DCM, r.t.; b) DCC, 4-(dimethylamino)-pyridine, DCM, r.t.; c) NEt$_3$, 35° C.

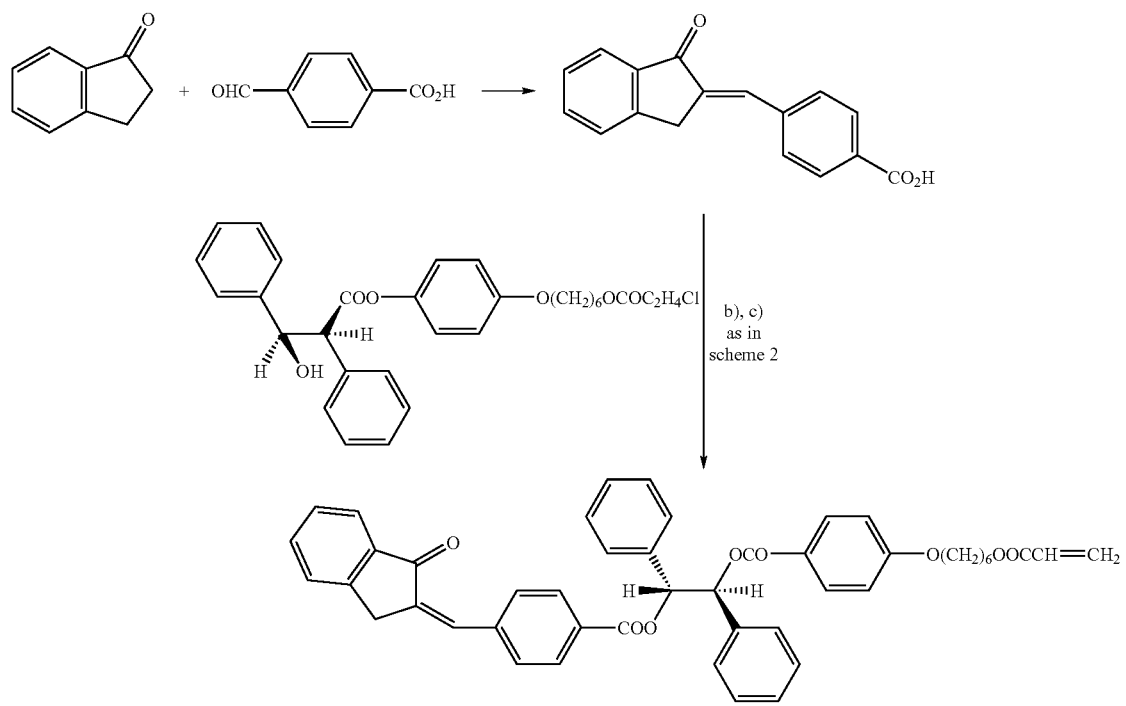

The inventive chiral compounds can be used in a liquid crystal mixture for liquid crystal displays exhibiting a twisted molecular structure of the liquid crystal matrix like, for example, twisted or supertwisted nematic displays with multiplex or active matrix addressing, or in displays comprising a liquid crystal mixture with a chiral liquid crystalline phase, like for example chiral smectic or chiral nematic (cholesteric) mixtures for ferroelectric or cholesteric displays.

The inventive compounds, mixtures and polymers are especially suitable for cholesteric displays, like for example surface stabilized or polymer stabilized cholesteric texture displays (SSCT, PSCT) as described in WO 92/19695, WO 93/23496, U.S. Pat. No. 5,453,863 or U.S. Pat. No. 5,493,430, in particular for liquid crystal devices with variable pitch, like multi-domain liquid crystal displays as described for example in WO 98/57223, or multicolour cholesteric displays as described for example in U.S. Pat. No. 5,668,614.

The entire disclosure of the above mentioned documents is introduced into this application by way of reference.

The inventive compounds of formula I are also suitable for use in photochromic liquid crystal media, which change their colour upon photoradiation.

Thus, another object of the invention is a liquid crystalline mixture comprising at least one chiral compound of formula I.

Yet another object of the invention are cholesteric liquid crystal displays comprising cholesteric liquid crystalline media containing at least one chiral compound of formula I.

Many of the inventive compounds are characterized by a good solubility in liquid crystalline host mixtures, and can be added as dopants to liquid crystalline hosts in high amounts without significantly affecting the phase behaviour and electrooptical properties of the mixture. Undesired spontaneous crystallization at low temperatures is thereby reduced and the operating temperature range of the mixture can be broadened. Furthermore, these chiral compounds can be used for the preparation of a highly twisted liquid crystal medium even if they have a low HTP, because the dopant concentration can be increased to yield low pitch values (i.e. high twist) without affecting the mixture properties. The use of a second dopant, which is often added to avoid crystallization, can thus be avoided.

Many of the inventive chiral compounds of formula I exhibit high values of the HTP. A liquid crystalline mixture with high helical twist, i.e. a low pitch, can be prepared by using these compounds as dopants, or a liquid crystalline mixture with moderate helical twist can be achieved by using these inventive compounds as dopants already in very small amounts.

As mentioned above, the inventive compounds are furthermore advantageous because they are affecting the physical properti s of the liquid crystalline mixture only to a minor extent.

Thus, when admixing the chiral compounds of formula I for example to a liquid crystalline mixture with positive dielectric anisotropy that is used in a liquid crystal display, $\Delta\epsilon$ is being only slightly reduced and the viscosity of the liquid crystalline mixture is increased only to a small extent. This leads to lower voltages and improved switching times of the display when compared to a display comprising conventional dopants.

A liquid crystalline mixture according to the invention comprises preferably 0.1 to 30%, in particular 1 to 25% and very particularly preferably 2 to 15% by weight of chiral compounds of formula I.

A liquid crystalline mixture according to the invention preferably comprises 1 to 3 chiral compounds of formula I.

In a preferred embodiment of the invention the liquid crystalline mixture is consisting of 2 to 25, preferably 3 to 15 compounds, at least one of which is a chiral compound of formula I. The other compounds are preferably low molecular weight liquid crystalline compounds selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohehexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexylpyridazines, phenyl- or cyclohexyldioxanes, phenyl- or cyclohexyl-1,3-dithianes, 1,2-diphenyl-ethanes, 1,2-dicyclohexylethanes, 1-phenyl-2-cyclohexylethanes, 1-cyclohexyl-2-(4-phenylcyclohexyl)-ethanes, 1-cyclohexyl-2-biphenyl-ethanes, 1-phenyl2-cyclohexylphenylethanes, optionally halogenated stilbenes, benzyl phenyl ether, tolanes, substituted cinnamic acids and further classes of nematic or nematogenic substances. The 1,4-phenylene groups in these compounds may also be laterally mono- or difluorinated.

The liquid crystalline mixture of this preferred embodiment is based on the achiral compounds of this type.

The most important compounds that are posssible as components of these liquid crystalline mixtures can be characterized by the following formula

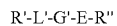

wherein L' and E, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl abd B is 2-(trans-1,4-cyclohexyl)ethyl, pyrimidine-2,5-diyl, pyridine-2,5-diyl or 1,3-dioxane-2,5-diyl.

G' in these compounds is selected from the following bivalent groups —CH=CH—, —N(O)N—, —CH=CY—, —CH=N(O)—, —C≡C—, —CH$_2$—CH$_2$—, —CO—O—, —CH$_2$—O—, —CO—S—, —CH$_2$—S—, —CH=N—, —COO-Phe-COO— or a single bond, with Y being halogen, preferably chlorine, or —CN.

R' and R" are, in each case, independently of one another, alkyl, alkenyl, alkoxy, alkenyloxy, alkanoyloxy, alkoxycarbonyl or alkoxycarbonyloxy with 1 to 18, preferably 3 to 12 C atoms, or alternatively one of R' and R" is F, CF$_3$, OCF$_3$, Cl, NCS or CN.

In most of these compounds R' and R" are, in each case, independently of each another, alkyl, alkenyl or alkoxy with different chain length, wherein the sum of C atoms in nematic media generally is between 2 and 9, preferably between 2 and 7.

Many of these compounds or mixtures thereof are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

A preferred use of the inventive compounds is the preparation of polymerizable liquid crystalline mixtures, anisotropic polymer gels and anisotropic polymer films, in particular polymer films that exhibit a helically twisted molecular structure with uniform planar orientation, i.e. wherein the helical axis is oriented perpendicular to the plane of the film, like oriented cholesteric films.

Anisotropic polymer gels and displays comprising them are disclosed for example in DE 195 04 224 and GB 2 279 659.

Oriented cholesteric polymer films can be used for example as broadband reflective polarizers, colour filters, security markings, or for the preparation of liquid crystal pigments.

Broadband cholesteric reflective polarizers are described for example in EP 0 606 940, WO 97/35219 or EP 0 982 605. Colour filters are described for example in EP 0 720 041 or EP 0 685 749 and R. Maurer et al., SID 1990 Digest, 110–113. Liquid crystal pigments are described for example in EP 0 601 483, WO 97/27251, WO 97/27252, WO 97/30136 or WO 99/11719.

For the preparation of anisotropic polymer gels or oriented polymer films, the liquid crystalline mixture should comprise at least one polymerizable compound, preferably a polymerizable mesogenic compound.

Thus, another object of the invention are polymerizable liquid crystalline mixtures comprising at least two compounds, at least one of which is a chiral compound of formula I and at least one of which is a polymerizable compound. The polymerizable compound can be said at least one compound of formula I or an additional compound.

Examples of suitable polymerizable mesogenic compounds that can be used as co-components in the polymerizable mixture are disclosed for example in WO 93/22397; EP 0,261,712; DE 195,04,224; WO 95/22586 and WO 97/00600. The compounds disclosed in these documents, however, are to be regarded merely as examples that shall not limit the scope of this invention. Preferably the polymerizable mixture comprises at least one polymerizable mesogenic compound having one polymerizable functional group and at least one polymerizable mesogenic compound having two or more polymerizable functional groups.

Examples of especially useful monoreactive chiral and achiral polymerizable mesogenic compounds are shown in the following list of compounds, which should, however, be taken only as illustrative and is in no way intended to restrict, but instead to explain the present invention:

wherein, P has one of the meanings given above, x is an integer from 1 to 12, A is 1,4-phenylene or 1,4-cyclohexylene, v is 0 or 1, $Y^0$ is a polar group, $R^7$ is an unpolar alkyl or alkoxy group, Ter is a terpenoid radical like e.g. menthyl, Chol is a cholesteryl group, and $L^1$ and $L^2$ are each independently H, F, Cl, CN, OH, $NO_2$ or an optionally halogenated alkyl, alkoxy or carbonyl group with 1 to 7 C atoms.

The polar group $Y^0$ is preferably CN, $NO_2$, halogen, $OCH_3$, OCN, SCN, $COR^8$, $COOR^8$ or a mono- oligo- or polyfluorinated alkyl or alkoxy group with 1 to 4 C atoms. $R^8$ is optionally fluorinated alkyl with 1 to 4, preferably 1 to 3 C atoms. Especially preferably the polar group $Y^0$ is selected of F,Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$, and $OC_2F_5$, in particular F, Cl, CN, $OCH_3$ and $OCF_3$.

The unpolar group $R^7$ is preferably an alkyl group with 1 or more, preferably 1 to 15 C atoms or an alkoxy group with 2 or more, preferably 2 to 15 C atoms.

Examples of useful direactive chiral and achiral polymerizable mesogenic compounds are shown in the following list of compounds, which should, however, be taken only as illustrative and is in no way intended to restrict, but instead to explain the present invention

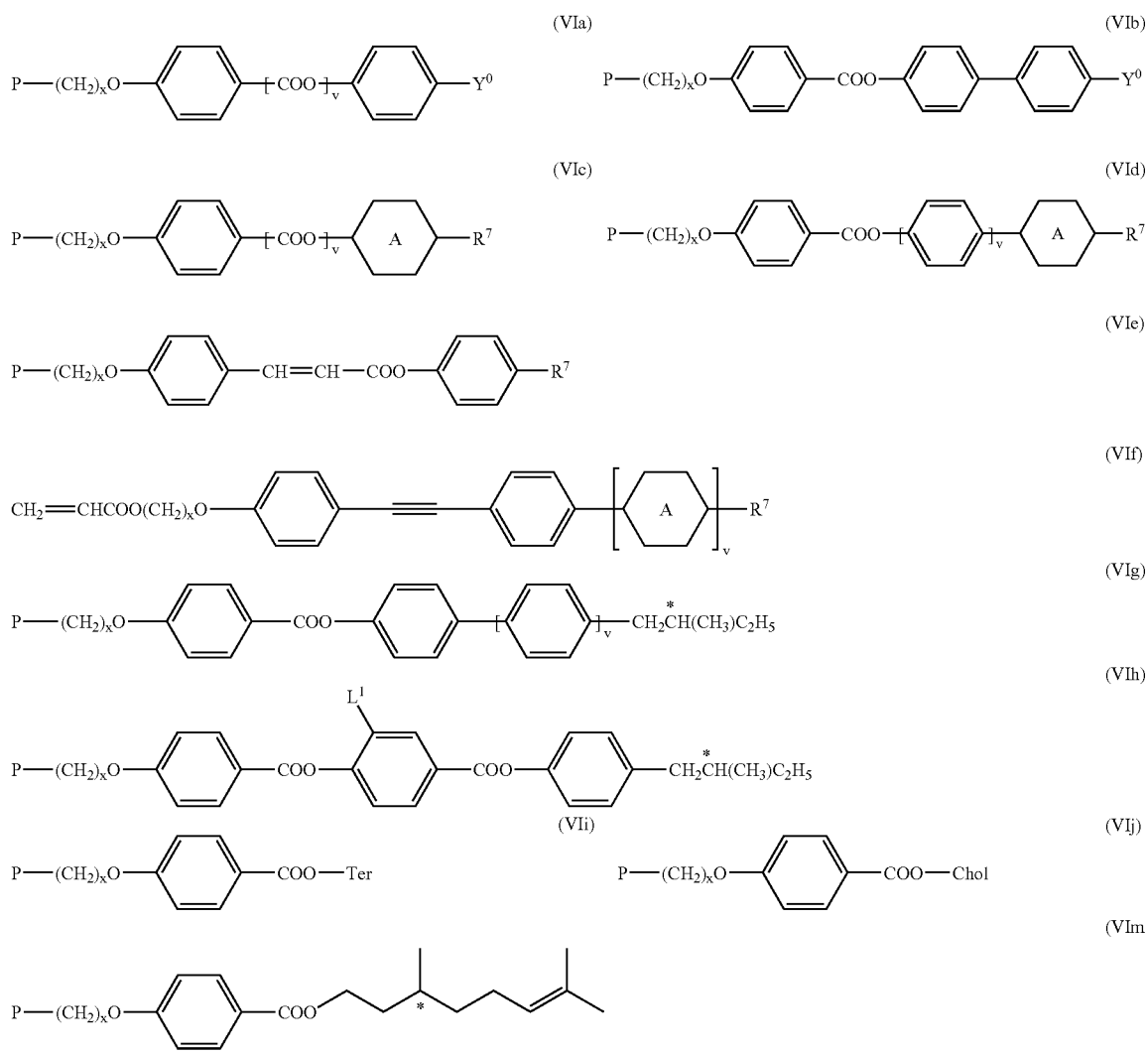

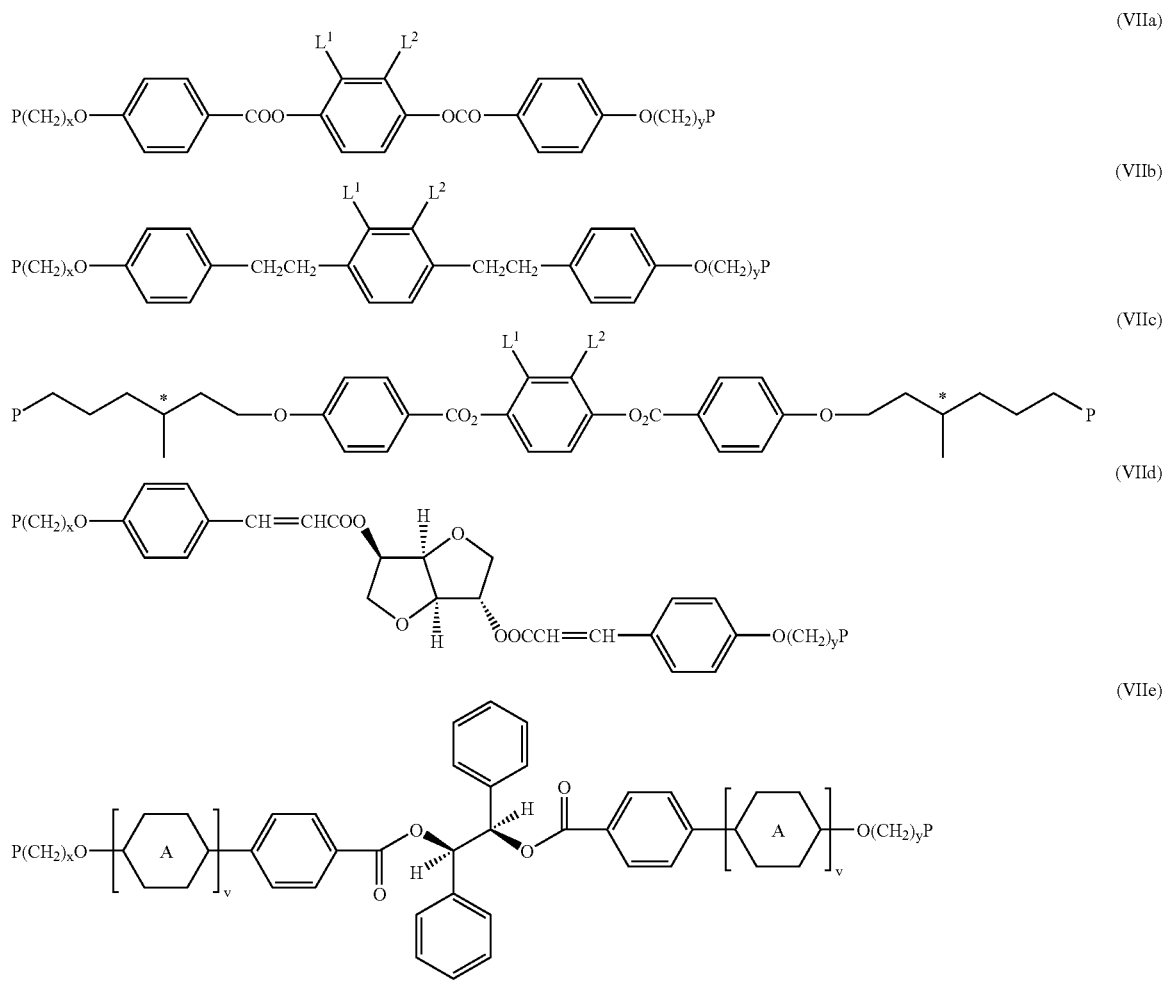

wherein P, x, A, $L^1$ and $L^2$ have one of the meanings given above and y is an integer from 1 to 12 the same as or different from x.

The mono- and difunctional polymerizable mesogenic compounds of above formulae VI and VII can be prepared by methods which are known per se and which are described in the documents cited above and, for example, in standard works of organic chemistry such as, for example, Houben-Weyl, Methoden der organischen Chemie, Thieme-Verlag, Stuttgart.

In a preferred embodiment of the invention the polymerizable liquid crystalline mixtures comprise at least one inventive chiral compound of formula I, at least one monofunctional compound of formulae VIa–VIm and at least one bifunctional polymerizable compound of formulae VIIa–VIIe.

In another preferred embodiment the polymerizable liquid crystalline mixtures comprise at least one inventive chiral compound and at least two monofunctional compounds of formulae VIa–VIm.

Another object of the invention is an anisotropic polymer film with an oriented chiral liquid crystalline phase obtainable by (co)polymerizing a liquid crystalline mixture comprising at least one chiral compound of formula I and at least one polymerizable mesogenic compound preferably selected of formula VIa–VIm and VIIa–VIIe and/or at least one polymerizable chiral compound of formula I.

The preparation of an anisotropic polymer film with twisted structure from a polymerizable mixture is generally described for example in D. J. Broer, et al., Angew. Makromol. Chem. 183, (1990), 45–66. The cholesteric polymerizable mixture is coated onto a substrate, aligned into uniform planar orientation, and polymerized in situ by exposure to heat or actinic radiation, thereby fixing the uniform alignment. Alignment and curing are carried out in the chiral liquid crystalline phase of the polymerizable mixture.

Actinic radiation means irradiation with light, like UV light, IR light or visible light, irradiation with X-rays or gamma rays or irradiation with high energy particles, such as ions or electrons. As a source for actinic radiation for example a single UV lamp or a set of UV lamps can be used. Another possible source for actinic radiation is a laser, like e.g. a UV laser, an IR laser or a visible laser.

For example, when photopolymerizing by means of UV light, a photoinitiator can be used that decomposes under UV irradiation to produce free radicals or ions that start the polymerization reaction. It is also possible to use a cationic photoinitiator, when curing reactive mesogens with for example vinyl and epoxide reactive groups, that photocures with cations instead of free radicals. As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used. Preferably the polymerizable liquid crystalline mixtures comprising polymerizable chiral compounds of formula I and/or polymerizable mesogenic compounds of formulae VI and VII additionally comprise 0.01 to 10%, in particular 0.05 to 8%, very preferably 0.1 to 5% by weight of a photoinitiator, especially preferably a UV-photoinitiator.

Preferably polymerization is carried out under an atmosphere of inert gas, preferably under a nitrogen atmosphere.

As a substrate for example a glass or quarz sheet as well as a plastic film or sheet can be used. It is also possible to put a second substrate on top of the coated mixture prior to, during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

The polymerizable mixture is preferably coated as a thin layer on a substrate or between substrate, and aligned in its chiral mesophase, e.g. the cholesteric or chiral smectic phase, to give a planar orientation, i.e. wherein the axis of the molecular helix extends transversely to the layer. Planar orientation can be achieved for example by shearing the mixture, e.g. by means of a doctor blade. It is also possible to apply an alignment layer, for example a layer of rubbed polyimide or sputtered $SiO_x$, on top of at least one of the substrates. Alternatively, a second substrate is put on top of the coated material. In this case, the shearing caused by putting together the two substrates is sufficient to give good alignment. It is also possible to apply an electric or magnetic field to the coated mixture.

In some cases it is of advantage to apply a second substrate not only to aid alignment of the polymerizable mixture but also to exclude oxygen that may inhibit the polymerization. Alternatively curing can be carried out under an atmosphere of inert gas. However, curing in air is also possible using suitable photoinitiators and high lamp power. When using a cationic photoinitiator oxygen exclusion most often is not needed, but water should be excluded.

An inventive polymerizable liquid crystalline mixture for the preparation of anisotropic polymer films comprises preferably 0.1 to 35%, in particular 0.5 to 15% and very particularly preferably 0.5 to 5% by weight of one or more polymerizable chiral compounds of formula I. Polymerizable liquid crystalline mixtures are preferred that comprise 1 to 3 chiral compounds of formula I.

The inventive polymerizable liquid crystalline mixtures can additionally comprise one or more other suitable components such as, for example, catalysts, sensitizers, stabilizers, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

Preferably the inventive polymerizable mixture comprises a stabilizer that is used to prevent undesired spontaneous polymerization for example during storage of the composition. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

It is also possible, in order to increase crosslinking of the polymers, to add a non mesogenic compound with two or more polymerizable functional groups, preferably in an amount of up to 20% by weight, to the polymerizable mixture alternatively or additionally to multifunctional mesogenic polymerizable compounds. Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

Polymerization of inventive compositions comprising compounds with only one polymerizable functional group leads to linear polymers, whereas in the presence of compounds with more than one polymerizable functional group crosslinked polymers are obtained.

For the preparation of anisotropic polymer gels, the liquid crystalline mixtures can be polymerized in situ as described above, however, in this case alignment of the polymerizable mixture is not always necessary.

Due to the presence of a photoisomerizable group in the compounds of formula I, the chirality of the inventive compounds and liquid crystalline mixtures can be changed by photoirradiation. Photoirradiation can be achieved for example with irradiation by UV light or other high energy sources such as lasers.

The photoisomerizable compounds of formula I are particularly suitable for the preparation of cholesteric films or layers with planar alignment. Such layers or films show selective reflection of visible light that is circularly polarized, caused by interaction of incident light with the helically twisted structure of the cholesteric material. The central wavelength of reflection λ depends on the pitch p and average refractive index n of the cholesteric material according to equation (2)

$$\lambda = n \cdot p \quad (2)$$

The bandwidth Δλ of the reflected wavelength band depends on the pitch and the birefringence Δn of the cholesteric material according to equation (3)

$$\Delta\lambda = \Delta n \cdot p \quad (3)$$

The inventive compounds and mixtures can for example be used to prepare reflective cholesteric films wherein the optical properties, like the reflection wavelength λ and the reflection bandwidth Δλ, can be varied easily. For example, cholesteric reflective films with a horizontal pattern comprising regions of different reflection wavelength λ, or broadband reflective films with a broad bandwidth Δλ of the reflected wavelength band can be prepared. The preparation of such films is described for example in WO 00/34808 and in P. van de Witte et al., J. Mater. Chem. 9 (1999), 2087–2094, the entire disclosure of which is incorporated into this application by way of reference. The preparation of patterned cholesteric films and of broadband reflective films is also exemplarily described below.

A cholesteric film with variable wavelength can for example be prepared as follows:

A thin layer of a cholesteric polymerizable mixture comprising an inventive chiral photoisomerizable compound of formula I is coated onto a substrate and aligned into planar orientation as described above. The coated and aligned layer shows selective reflection of a wavelength λ that is depending on the helical pitch p according to above equation (2). If the coated layer is exposed to photoradiation of a suitable wavelength, the photoisomerizable group(s) in the compound of formula I is isomerized. For example, in case the compound of formula I comprises a photoisomerizable group PI of formula IIIa wherein $D^1$ and D are CH (stilbene group), the stilbene group will undergo E-Z-isomerization if the wavelength of radiation is selected accordingly between 300 and 400 nm. This causes a shift of the HTP of the photoisomerizable compound and, according to above equation (1), a change in the helical pitch p and thus in the reflection wavelength λ of the layer. The degree of isomerization and the shift of λ can be controlled by varying e.g. the irradiation time and/or the radiation dose. The structure of the layer is then fixed by in-situ polymerization.

If only a part of the layer is exposed to photoradiation, the helical pitch and reflection wavelength will change only in th exposed parts, but remain unchanged in the non-exposed parts. This can be achieved for example by photoradiation through a photomask that is applied on top of the coated layer. Afterwards, the cholesteric structure is fixed in those parts where the pitch has changed by polymerization, for example by in-situ photopolymerization through the photomask. If the above steps of photoisomerization and (photo) polymerization are then repeated for the previously non-exposed parts of the coated layer under different conditions, e.g. different irradiation time and/or radiation dose, a patterned cholesteric film is obtained with different regions showing different reflection wavelengths. Such patterned films are suitable for example for use as colour filter in optical or electrooptical devices like liquid crystal displays or projectors. They can also be used for security markings, e.g. to identify or prevent falsification of credit cards, passports, bank notes or other documents of value.

A broadband reflective cholesteric film can for example be prepared as follows:

A layer of a cholesteric mixture with planar orientation comprising a photoisomerizable compound of formula I additionally comprises a dye having an absorption maximum at the wavelength where the isomerizable compound shows photoisomerization. For example, the mixture may comprise an isomerizable compound showing isomerization at a wavelength in the UV range together with a UV dye. If the mixture is exposed to UV radiation as described above, the dye will create a gradient in UV light intensity throughout the thickness of the layer. As a consequence, the isomerization is faster at the top of the layer than at the bottom and a pitch gradient is created, leading to a broadening of the reflected wavelength band. The pitch gradient and reflection bandwidth can be controlled for example by varying the film thickness, irradiation time, radiation dose and/or the concentration of the UV dye and the photoisomerizable compound. If the cholesteric mixture comprises one or more polymerizable components, the structure of the film can be fixed by in-situ polymerization.

From the foregoing description, one skilled in the art can easily ascertain the essential characteristics of this invention, and without departing from the spirit and scope thereof, can make various changes and modifications of the invention to adapt it to various usages and conditions.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

The values of the helical twisting power HTP of a chiral compound in a liquid crystalline host are given according to the equation $HTP=(p \cdot c)^{-1}$ in $\mu m^{-1}$ wherein p is the pitch of the molecular helix, given in μm, and c is the concentration by weight of the chiral compound in the host given in relative values (thus, e.g. a concentration of 1% by weight is corresponding to a value of c of 0.01).

Unless indicated otherwise, the HTP values of the examples were determined in the commercially available liquid crystal host mixture MLC-6260 (Merck KGaA, Darmstadt, Germany) at a concentration of 1% and a temperature of 20° C.

The following abbreviations are used to illustrate the liquid crystalline phase behaviour of the compounds: C=crystalline; N=nematic; S=smectic; N*, Ch=chiral nematic or cholesteric; I=isotropic. The numbers between these symbols indicate the phase transition temperatures in degree Celsius. Furthermore, mp. is the melting point, Δn is the birefringence at 589 nm and 20° C. and Δε is the dielectric anisotropy at 20° C. C* in a chemical formula denotes a chiral C atom. DCM is dichloromethane.

"Conventional workup" means: water is added if necessary, the mixure is extracted with methylene chloride, diethyl ether or toluene, the phases are separated, the organic phase is dried and concentrated by evaporation, and the product is purified by crystallization and/or chromatography.

EXAMPLES

Example 1

Compound (1) was prepared as described below

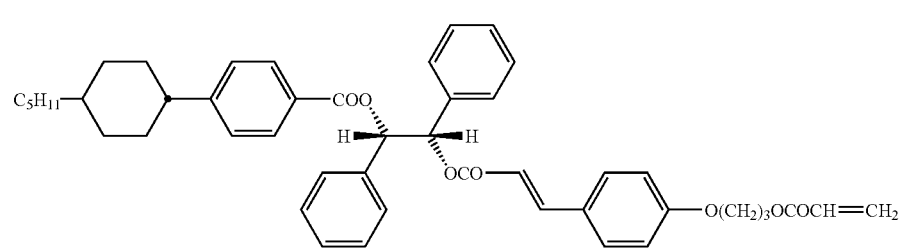

(1)

4-(4-Pentyl-cyclohexyl)-benzoic acid 2-Hydroxy-1, 2-diphenyl-ethyl ester (1a)

To a jacketed flask (1L) 4-(4-pentyl-cyclohexyl)-benzoic acid (6.31 g, 23 mmol), S,S-1,2-dipheny-ethane-1,2-diol (5.00 g, 23 mmol), 4-(dimethylamino)-pyridine (0.24 g, 2 mmol) and N,N'-dicyclohexylcarbodiimide (5.16 g, 25 mmol) were added, followed by the addition of dichloromethane (50 mL), and the mixture stirred at ambient temperature overnight. Solid material was then filtered, the organic layer washed with brine (2×25 mL), dried (MgSO$_4$) and the solvent removed under vacuum. Column chromatography (on silica, CH$_2$Cl$_2$ as eluent) gave 4-(4-Pentyl-cyclohexyl)-benzoic acid 2-hydroxy-1,2-diphenyl-ethyl ester (1a) (6.20 g, 13 mmol, 57%), structure confirmed by $^1$H, $^{13}$C, GC-MS and IR.

4-(4-Pentyl-cyclohexyl)-benzoic acid 2-{(E)-3-[4-(6-acryloyloxy-propyloxy)-phenyl]-allanoyloxy}-1, 2-diphenyl-ethyl ester (1)

To a round bottomed flask ester (1a) (3.00 g, 6 mmol), (E)-3-{4-[6-(3-Chloro-propanoyloxy)-propyloxy]-phenyl}-acrylic acid (2.13 g, 8 mmol)), 4-(dimethylamino)-pyridine (0.12 g, 1 mmol) and N,N'-dicyclohexylcarbodiimide (1.44 g, 7 mmol) were added, followed by the addition of dichloromethane (100 mL), and the mixture stirred at ambient temperature for 42 h. Triethylamine (1.25 mL, 9 mmol) was then added and the mixture stirred at 35° C. overnight after which time the mixture was filtered, washed with brine (3×30 mL), dried (MgSO$_4$) and the solvent removed under vacuum. Column chromatography (on silica, ethyl acetate and 40–60 petrol as eluent 1:9) gave 4-(4-Pentyl-cyclohexyl)-benzoic acid 2-{(E)-3-[4-(6-acryloyloxy-propyloxy)-phenyl]-allanoyloxy}-1,2-diphenyl-ethyl ester (1) (2.0 g, 3 mmol, 43%), structure confirmed by $^1$H, $^{13}$C, GC—MS and IR.

m.p.=72° C, HTP=43

Example 2–9

Compound (2) was prepared as described below

4-(4-Pentyl-cyclohexyl)-benzoic acid 2-(4-Formyl-benzoic acid)-1.2-diphenyl-ethyl ester (2a)

To a round bottomed flask ester (1a) of example 1 (5.00 g, 11 mmol), 4-formyl-benzoic acid (1.65 g, 11 mmol)), 4-(dimethylamino)-pyridine (0.12 g, 1 mmol) and N,N'-dicyclohexylcarbodiimide (2.27 g, 11 mmol) were added, followed by the addition of dichloromethane (50 mL), and the mixture stirred overnight at 35° C. The reaction mixture was then filtered, washed with water (2×25 mL), dried (MgSO$_4$) and the solvent removed under vacuum. Column chromatography (on silica, CH$_2$Cl$_2$ as eluent) gave 4-(4-Pentyl-cyclohexyl)-benzoic acid 2-(4-formyl-benzoic acid)-1,2-diphenyl-ethyl ester (2a) (2.09, 3 mmol, 43%), structure confirmed by $^1$H, $^{13}$C, GC-MS and IR.

4-(4-Pentyl-cyclohexyl)-benzoic acid 2-(4-[(E)-2-(4-Butoxy-phenyl)-vinyl]-benzoic acid)-1,2-diphenyl-ethyl ester (2)

(4-n-Butoxybenzyl)triphenylphosphonium bromide (3.54 g, 7 mmol) was added to a jacketed vessel (1 L), dissolved in tetrahydrofuran (200 mL) and cooled to 5° C. Potassium t-butoxide (0.90 g, 8 mmol) was then added and the mixture stirred for 30 min., after which ester (2a) (4.00 g, 7 mmol) was added and stirred for a further 30 min., before slowly increasing the temperature to 25° C. and stirring overnight. The reaction mixture was then washed with brine (2×50 mL), the organic layer dried (MgSO$_4$) and the solvent removed under vacuum. After column chromatography (on silica, 1$^{st}$ with CH$_2$Cl$_2$ as eluent, 2$^{nd}$ with ethyl acetate and petrol (40–60) as eluent 1:9) 4-(4-Pentyl-cyclohexyl)-benzoic acid 2-(4-[(E)-2-(4-Butoxy-phenyl)-vinyl]-benzoic acid)-1,2-diphenyl-ethyl ester (2) was isolated as both the cis- (0.80 g, 1 mmol, 15%) and trans- (1.00 g, 1 mmol, 19%) isomers. The structures were confirmed by $^1$H, $^{13}$C, GC-MS and IR.

cis-isomer: m.p.=96° C., HTP=13 trans-isomer: m.p.=130° C., HTP=33

The following compounds, wherein n is 3 or 6, are prepared analoguously

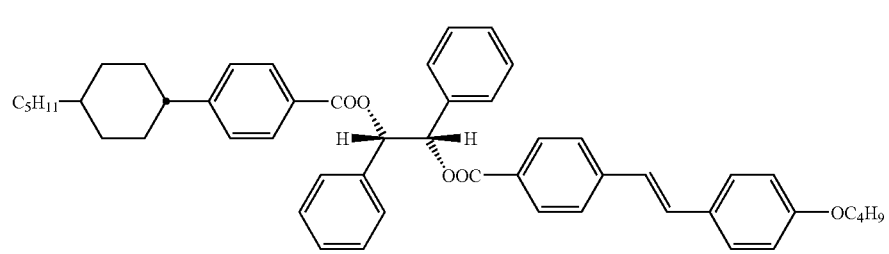

(2)

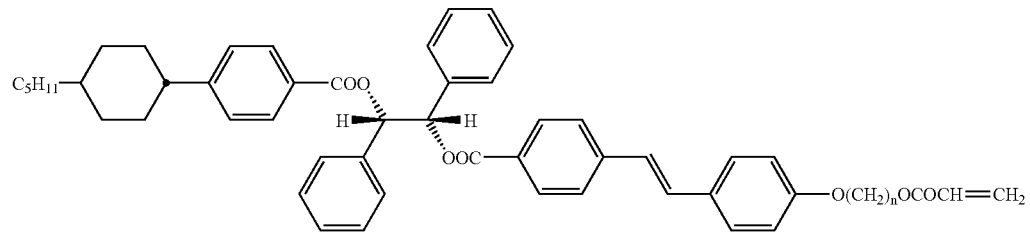
(3)
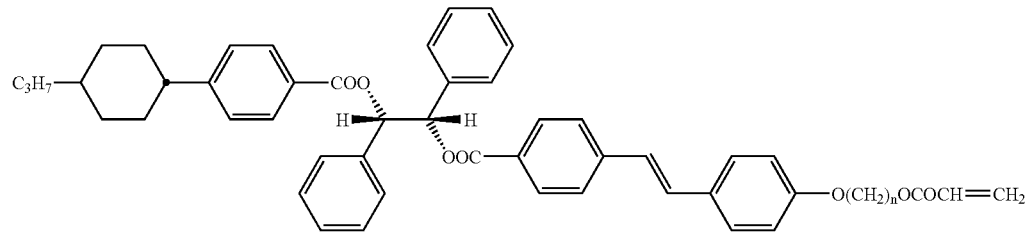
(4)
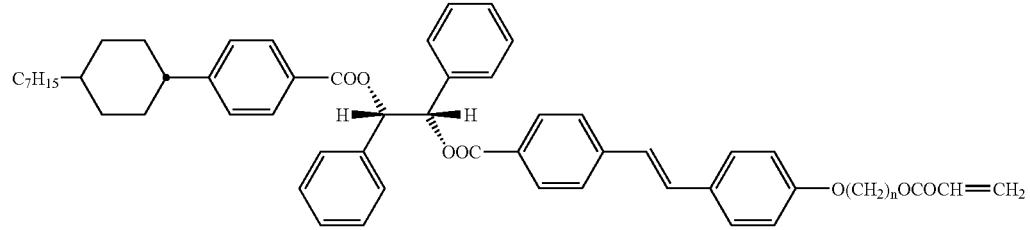
(5)
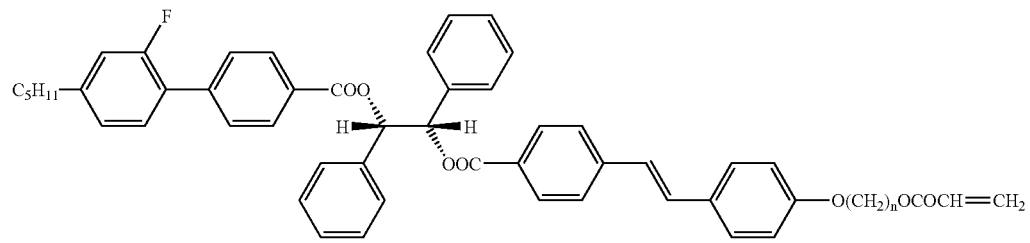
(6)
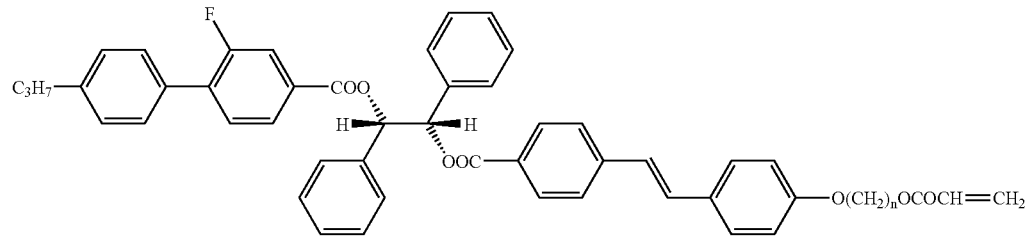
(7)
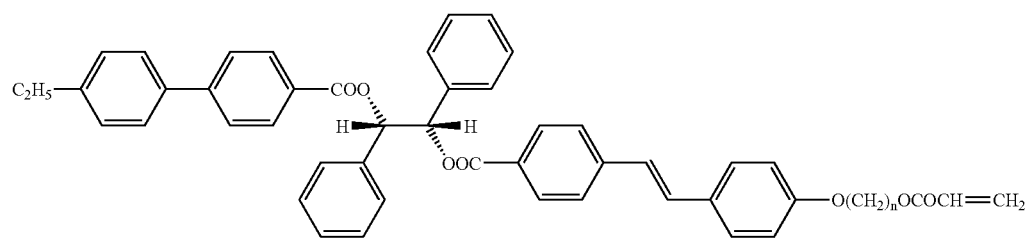
(8)

-continued

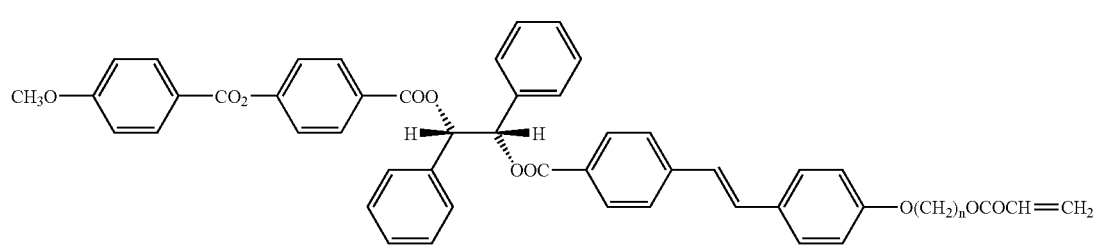

(9)

Example 10—Preparation of a Polymer Film

The polymerizable mixture M was formulated, comprising
Compound A 51.70%
Compound B 12.95%
Compound C 23.70%
Compound D 9.30%
FX 13 1.16%
TPO 1.16%
4-Methoxyphenol 0.03%

Hg pressure lamp in an $N_2$ atmosphere. In this way, the following polymer films are obtained

| Sample | P1 | P2 | P3 | P4 | P5 |
|---|---|---|---|---|---|
| Isomerization time (s) | 0 | 0.5 | 1 | 2 | 3 |

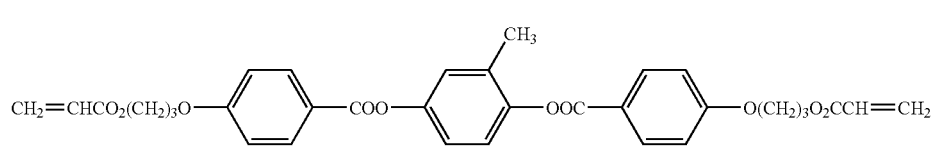

(A)

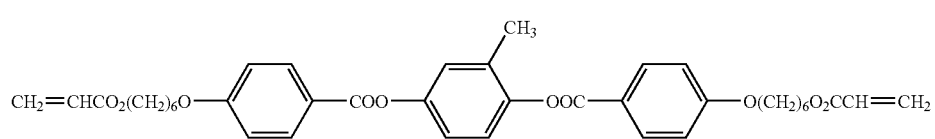

(B)

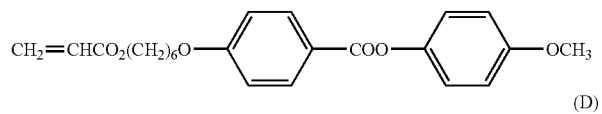

(C)

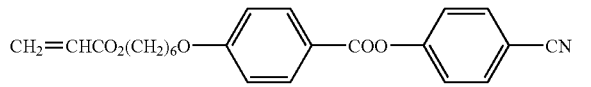

(D)

Compounds (A), (B), (C) and (D) can be prepared according or in analogy to the methods described in D. J.Broer et al., Makromol. Chem. 190, 3201–3215 (1989). FX13® is a polymerizable nonionic surfactant with a perfluoroalkyl group which is commercially available from 3M Corp. TPO (2,4,6-trimethylbenzoyl-diphenylphosphine oxide, Trademark Lucirin® TPO) is a commercially available photoinitiator (from BASF AG).

Mixture M is dissolved in xylene to give solution S1 with a concentration of 50% of total solids. 0.0395 g of compound (1) of example 1 are added to 0.9566 g of solution S1 to give solution S2 with the concentration of (1) being 7.94% of total solids.

Thin films of the solution S2 are coated onto a substrate and isomerized in air for different periods of time, using 3.8 mW/cm$^{-2}$ radiation from a medium pressure Hg lamp. Immediately after isomerization each film was polymerized using approx. 15 mW/cm$^{-2}$ radiation from the same medium The reflection spectrum of the polymer films P1–P5 are depicted in FIG. 1. It can be seen that the central wavelength of reflection is shifted towards higher values with increasing isomerization time. FIG. 2 depicts the central wavelength of reflection of films P1–P5 versus isomerization time.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various conditions and usages.

The invention claimed is:

1. A photoisomerizable chiral compound of formula I

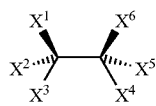

wherein
$X^1$, $X^2$, $X^3$, $X^4$, $X^5$ and $X^6$ independently of each other denote H, straight chain or branched alkyl with 1 to 20 C atoms wherein one or more $CH_2$ groups can also be replaced by —O—, —S—, —CO—, —NR$^0$—, —CH═CH—, or —C≡C— in such a manner that O and/or S atoms are not linked directly to one another and wherein one or more H-atoms can also be replaced by F or Cl, or denote an aliphatic or aromatic carbocyclic or heterocyclic group with 3 to 40 C atoms that may also comprise fused and/or substituted rings, or two of $X^1$, $X^2$, $X^3$, $X^4$, $X^5$ and $X^6$ may also together form an optionally substituted cyclic group with up to 40 C atoms, $R^0$ is H or alkyl with 1 to 4 C atoms, with the provisos that $X^1 \neq X^2 \neq X^3$ and $X^4 \neq X^5 \neq X^6$ and that the compound comprises at least one photoisomerizable group and at least one mesogenic group, or at least one group that is photoisomerizable and mesogenic.

2. A photoisomerizable chiral compound according to claim 1, wherein
$X^1$, $X^2$, $X^3$, $X^4$, $X^5$ and $X^6$ are independently of each other
  a) H or straight chain or branched alkyl with 1 to 20 C atoms wherein one or more $CH_2$ groups can also be replaced by —O—, —S—, —CO—, —NR$^0$—, —CH═CH—, —C≡C— in such a manner that O and/or S atoms are not linked directly to one another and wherein one or more H-atoms can also be replaced with F or Cl,
  b) —B-(Sp)$_n$-G, or
  c) —B-(Sp)$_n$-(M$^1$-Z$^1$)-(PI)$_k$-(Z$^2$-M$^2$)$_l$-R, wherein two of $X^1$, $X^2$, $X^3$, $X^4$, $X^5$ and $X^6$ may also form together a cyclic group with up to 40 C atoms that is optionally substituted with one or more groups R, and $X^1 \neq X^2 \neq X^3$ and $X^4 \neq X^5 \neq X^6$, $R^0$ is H or alkyl with 1 to 4 C atoms, G is an aliphatic or aromatic carbocyclic or heterocyclic group with 3 to 40 C atoms that may also comprise fused rings and may also be substituted with one or more groups R, R is H, halogen, $NO_2$, CN, SCN, $SF_5$, straight chain, branched or cyclic alkyl with 1 to 25 C atoms wherein one or more $CH_2$ groups can also be replaced by —O—, —S—, —CO—, —NR$^0$—, —CH═CH—, —C≡C— in such a manner that O and/or S atoms are not linked directly to one another, and wherein one or more H-atoms can also be replaced by F or Cl, or P-(Sp)$_n$-, P is a polymerizable group, Sp is a spacer group with 1 to 20 C atoms, n is 0 or 1, B is —O—, —COO—, —S—, —NR$^0$—, —O—CO—, —NR$^0$—CO—, —O—COO—, —OCH$_2$—, —S—CO—, —S—COO— or a single bond, PI is a photoisomerizable group that may in addition be mesogenic, $M^1$ and $M^2$ are independently of each other a mesogenic group, i, k and l are independently of each other 0 or 1, $Z^1$ and $Z^2$ are independently of each other —O—, —S—, —CO—, —COO—, —OCO—, —CO—NR$^0$—, —NR$^0$—CO—, —CH$_2$CH$_2$—, —CF$_2$CF$_2$—, —CH$_2$CF$_2$—, —OCH$_2$—, —CH$_2$O—, —SCH$_2$—, —CH$_2$S—, —CF$_2$O—, —OCF$_2$—, —CH═CH—, —CF═CF—, —CH═CF—, —(CH$_2$)$_4$—, —CH═CH—COO—, —OCO—CH═CH—, —C≡C— or a single bond, and at least one of $X^1$, $X^2$, $X^3$, $X^4$, $X^5$ and $X^6$ is —B-Sp-(M$^1$-Z$^1$)$_i$-(PI)$_k$-(Z$^2$-M$^2$)$_l$-G, with k in at least one of those groups being 1.

3. A photoisomerizable chiral compound according to claim 2, wherein $M^1$ and $M^2$ are of formula II $$-(A^1\text{-}Z)_m\text{-}A^2-$$ II wherein
$A^1$ and $A^2$ are independently of each other selected from
  a) 1,4-phenylene in which, in addition, one or more CH groups may be replaced by N,
  b) 1,4-cyclohexylene in which, in addition, one or two non-adjacent $CH_2$ groups may be replaced by O and/or S,
  c) 1,3-dioxolane-4,5-diyl, 1,4-cyclohexenylene, 1,4-bicyclo-(2,2,2)-octylene, piperidine-1,4-diyl, naphthalene-2,6-diyl, decahydro-naphthalene-2,6-diyl, 1,2,3,4-tetrahydronaphthalene-2,6-diyl or indane-2,5-diyl, it being possible for all these groups to be unsubstituted or mono- or polysubstituted with L, L is halogen, CN, SCN, $NO_2$, $SF_5$ or an alkyl, alkoxy, alkylcarbonyl or alkoxycarbonyl group with 1 to 7 C atoms, wherein one or more H atoms may be substituted with F or Cl, Z are independently of each other —O—, —S—, —CO—, —COO—, —OCO—, —CO—NR$^0$—, —NR$^0$—CO—, —CH$_2$CH$_2$—, —CF$_2$CF$_2$—, —CH$_2$CF$_2$—, —OCH$_2$—, —CH$_2$O—, —SCH$_2$—, —CH$_2$S—, —CF$_2$O—, —OCF$_2$—, —CH═CH—, —CF═CF—, —CH═CF—, —(CH$_2$)$_4$—, —CH═CH—COO—, —OCO—CH═CH—, —C≡C— or a single bond, and m is 0, 1, 2 or 3.

4. A photoisomerizable chiral compound according to claim 3, wherein one to four of $X^1$ to $X^6$ denote H, cyclohexyl, phenyl that is optionally substituted with 1 to 4 groups L, or —(COO)$_o$—S with o being 0 or 1 and S being alkyl with 1 to 4 C atoms.

5. A photoisomerizable chiral compound according to claim 2, wherein PI is of formula III $$-C^1\text{-}D^1\!\!=\!\!D^2\text{-}C^2-$$ III wherein
$D^1$ and $D^2$ are independently of each other CH or N or a saturated C atom in a carbocyclic or heterocyclic 5- or 6-membered ring, and $C^1$ and $C^2$ are independently of each other a bivalent aliphatic or aromatic carbocyclic or heterocyclic group with 3 to 40 C atoms that may also comprise fused rings, $C^1$ and $D^1$ or $C^2$ and $D^2$ may also together form a cyclic group, and $C^1$ may also denote a single bond.

6. A photoisomerizable chiral compound according to claim 5, wherein PI is selected of the following formulae

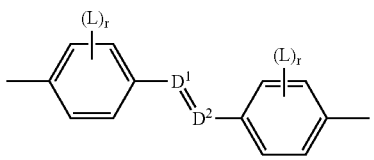
IIIa

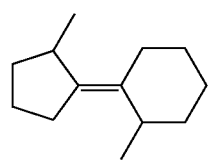
IIIb

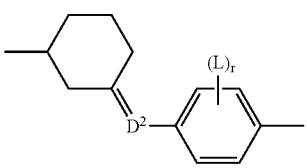
IIIc

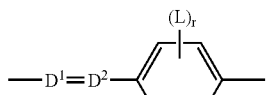
IIId

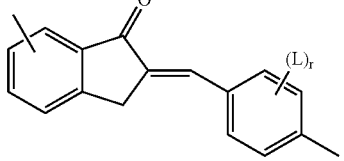
IIIe wherein
$D^1$ and $D^2$ are independently of each other CH or N or a saturated C atom in a carbocyclic or heterocyclic 5- or 6-membered ring, L is, each independently, halogen, CN, SCN, $NO_2$, $SF_5$ or an alkyl, alkoxy, alkylcarbonyl or alkoxycarbonyl group with 1 to 7 C atoms, wherein one or more H atoms may be substituted with F or Cl, and r is 0, 1, 2, 3 or 4.

7. A photoisomerizable chiral compound according to claim 1, selected of the following formulae

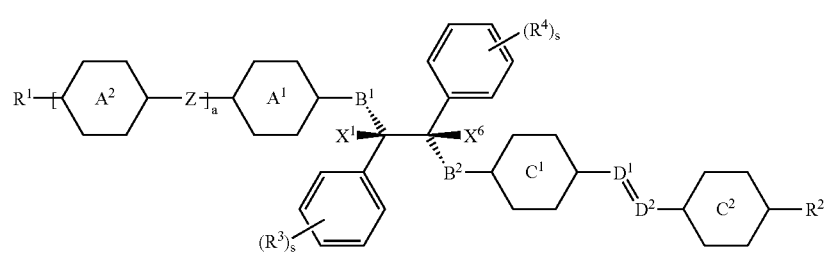
Ia

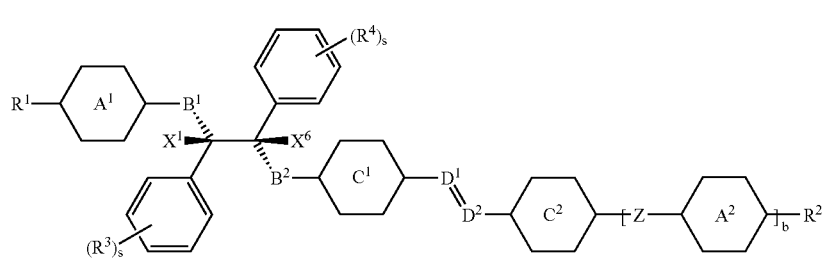
Ib

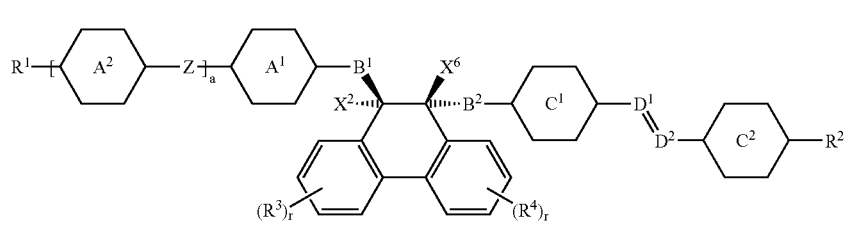
Ic

-continued
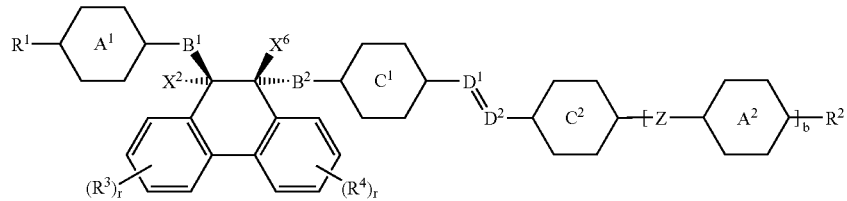
Id
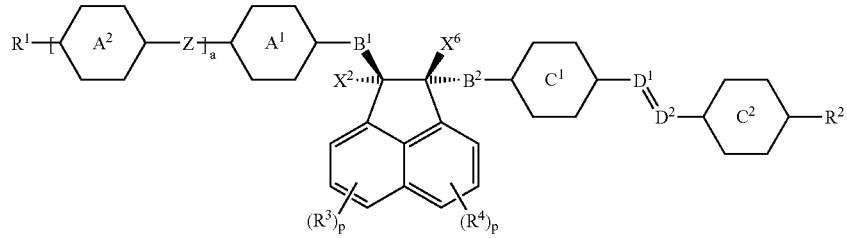
Ie
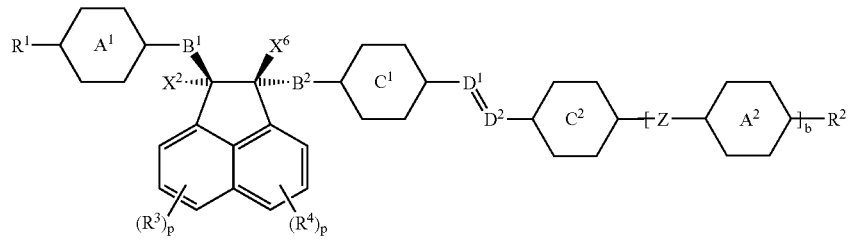
If
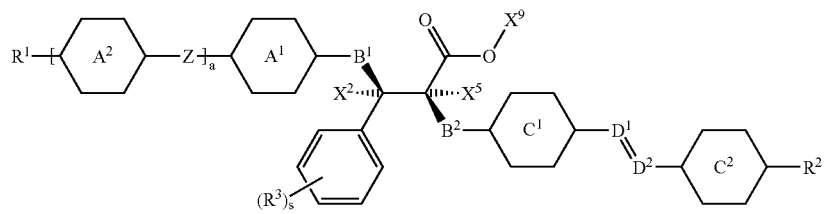
Ig
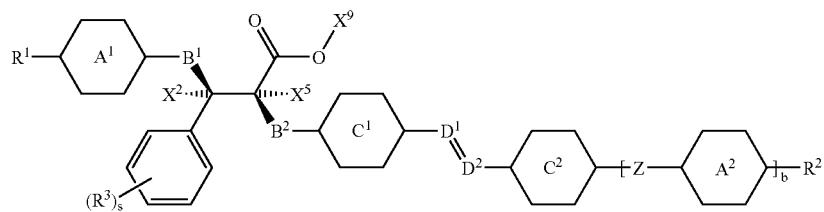
Ih
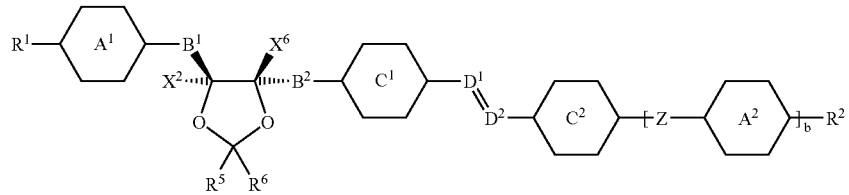
Ii
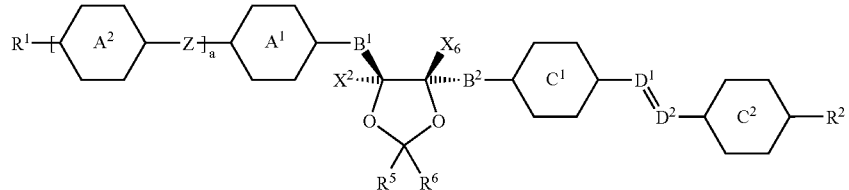
Ik -continued

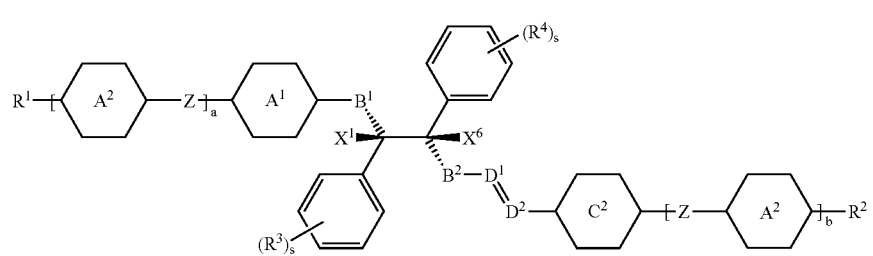
Im

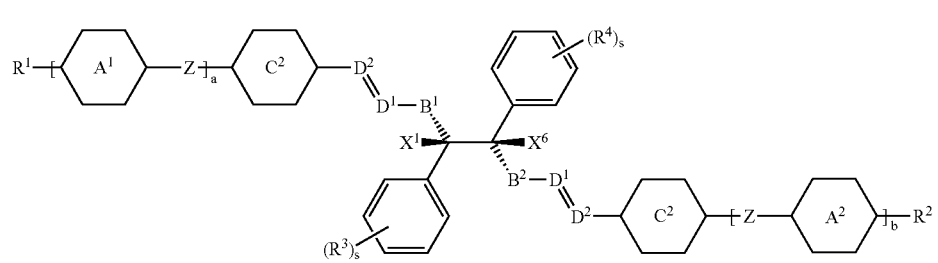
In

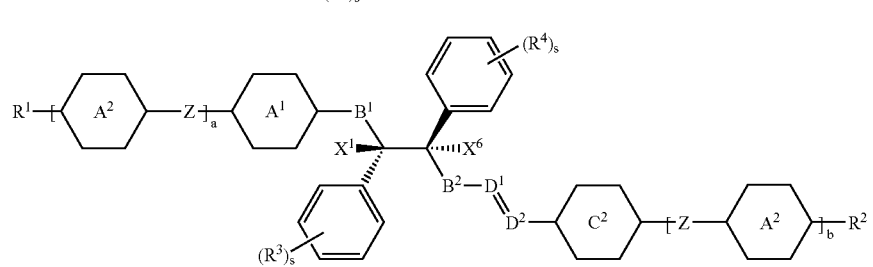
Io

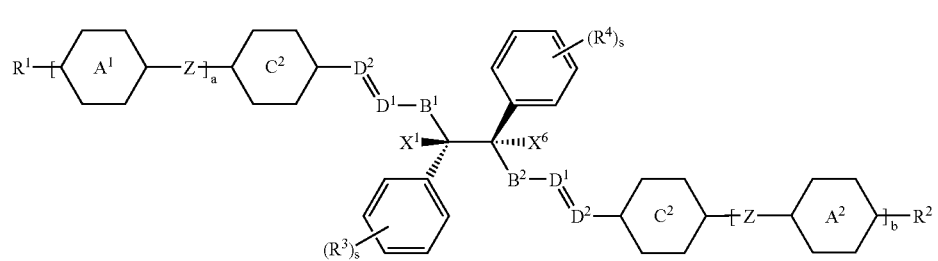
Ip

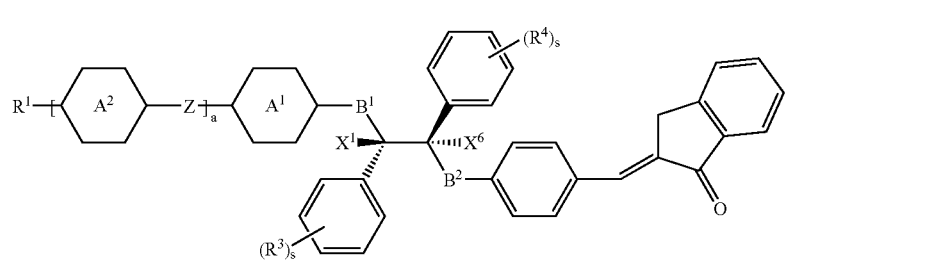
Iq wherein

 and 

are independently of each other selected from
a) 1,4-phenylene in which, in addition, one or more CH groups may be replaced by N,
b) 1,4-cyclohexylene in which, in addition, one or two non-adjacent $CH_2$ groups may be replaced by O and/or S,
c) 1,3-dioxolane-4,5-diyl, 1,4-cyclohexenylene, 1,4-bicyclo-(2,2,2)-octylene, piperidine-1,4-diyl, naphthalene-2,6-diyl, decahydronaphthalene-2,6-diyl, 1,2,3,4-tetrahydronaphthalene-2,6-diyl or indane-2,5-diyl, it being possible for all these groups to be unsubstituted or mono- or polysubstituted with L, L is halogen, CN, SCN, $NO_2$, $SF_5$ or an alkyl, alkoxy, alkylcarbonyl or alkoxycarbonyl group with 1 to 7 C atoms, wherein one or more H atoms may be substituted with F or Cl, Z, $Z^1$ and $Z^2$ are independently of each other —O—, —S—, —CO—, —COO—, —OCO—, —CO—$NR^0$—, —$NR^0$—CO—, —$CH_2CH_2$—, —$CF_2CF_2$—, 'CH$_2$CF$_2$—, —OCH$_2$—, —CH$_2$O—, —SCH$_2$—, —CH$_2$S—, —CF$_2$O—, —OCF$_2$—, —CH=CH—, —CF=CF—, —CH=CF—, —(CH$_2$)$_4$—, —CH=CH—COO—, —OCO—CH=CH—, —C≡C— or a single bond,

 and 

are independently of each other a bivalent aliphatic or aromatic carbocyclic or heterocyclic group with 3 to 40 C atoms that may also comprise fused rings, C$^1$ and D$^1$ or C$^2$ and D$^2$ may also together form a cyclic group, and C$^1$ may also denote a single bond, D$^1$ and D$^1$ are independently of each other CH or N or a saturated C atom in a carbocyclic or heterocyclic 5- or 6-membered ring, X$^1$, X$^2$, X$^5$ and X$^6$ are independently of each other
  a) H or straight chain or branched alkyl with 1 to 20 C atoms wherein one or more CH$_2$ groups can also be replaced by —O—, —S—, —CO—, —NR$^0$—, —CH=CH—, —C≡C— in such a manner that O and/or S atoms are not linked directly to one another and wherein one or more H-atoms can also be replaced with F or Cl,
  b) —B-(Sp)-G, or
  c) —B-(Sp)$_n$-(M$^1$-Z$^1$)$_j$-(PI)$_k$-(Z$^2$-M$^2$)$_l$—R,
wherein two of X$^1$, X$^2$, X$^5$ and X$^6$ may also form together a cyclic group with up to 40 C atoms that is optionally substituted with one or more groups R, B, B$^1$ and B$^2$ are, each independently, —O—, —COO—, —S—, —NR$^0$—, —O—CO—, —NR$^0$—CO—, —O—COO—, —OCH$_2$—, —S—CO—, —S—COO— or a single bond, G is an aliphatic or aromatic carbocyclic or heterocyclic group with 3 to 40 C atoms that may also comprise fused rings and may also be substituted with one or more groups R, R is H, halogen, NO$_2$, CN, SCN, SF$_5$, straight chain, branched or cyclic alkyl with 1 to 25 C atoms wherein one or more CH$_2$ groups can also be replaced by —O—, —S—, —CO—, —NR$^0$—, —CH=CH—, —C≡— in such a manner that O and/or S atoms are not linked directly to one another, and wherein one or more H-atoms can also be replaced by F or Cl, P is a polymerizable group, Sp is a spacer group with 1 to 20 C atoms, n is 0 or 1, PI is a photoisomerizable group that may in addition be mesogenic, M1 and M2 are independently of each other a mesogenic group and i,k and 1 are independently of each other 0 or 1, R$^0$ is H or alkyl with 1 to 4 C atoms, R, R$^1$, R$^2$, R$^3$, R$^4$, R$^5$ and R are, each independently, H, halogen, NO$_2$, CN, SCN, SF$_5$, straight chain, branched or cyclic alkyl with 1 to 25 C atoms wherein one or more CH$_2$ groups can also be replaced by —O—, —S—, —CO—, —NR$^0$—, —CH=CH—, —C≡C— in such a manner that O and/or S atoms are not linked directly to one another, and wherein one or more H-atoms can also be replaced by F or Cl, or P-(Sp)$_n$, X$^9$ is straight chain or branched alkyl with 1 to 25 C atoms wherein one or more CH$_2$ groups can also be replaced by —O—, —S—, —CO—, —NR$^0$—, —CH=CH—, —C≡C— in such a manner that O and/or S atoms are not linked directly to one another, and wherein one or more H-atoms can also be replaced by F or Cl, or denotes a cycloalkyl, phenyl, benzyl or fused carbocyclic or heterocyclic aliphatic or aromatic group with up to 25 C atoms that is optionally substituted with one or more groups R or L, or P-(Sp)$_n$, a is 0, 1, 2 or 3, b is 0, 1 or 2 p is in each case independently 0, 1, 2 or 3, r is in each case independently 0 , 1, 2, 3 or 4, and s is 0, 1, 2, 3, 4 or 5.

8. A photoisomerizable chiral compound according to of claim 1, selected of the following formulae

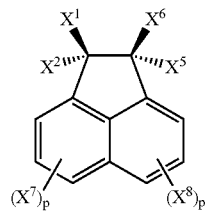

I-1

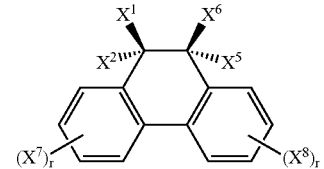

I-2

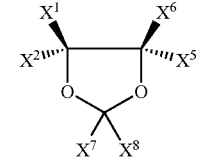

I-3 wherein

X$^7$ and X$^8$ are independently of each other halogen, NO$_2$, CN, SCN, SF$_5$, straight chain or branched alkyl with 1 to 25 C atoms wherein one or more CH$_2$ groups can also be replaced by —O—, —S—, —CO—, —NR$^0$—, —CH=CH—, —C≡C— in such a manner that O and/or S atoms are not linked directly to one another, and wherein one or more H-atoms can also be replaced by F or Cl, or denote an optionally substituted cycloalkyl, phenyl, benzyl or fused carbocyclic or heterocyclic aliphatic or aromatic group with up to 25 C atoms that is optionally substituted with one or more groups R, or P-(Sp)$_n$, R is H, halogen, NO$_2$, CN, SCN, SF$_5$, straight chain, branched or cyclic alkyl with 1 to 25 C atoms wherein one or more CH$_2$ groups can also be replaced by —O—, —S—, —CO—, —NR$^0$—, —CH=CH—, —C≡C— in such a manner that O and/or S atoms are not linked directly to one another, and wherein one or more H-atoms can also be replaced by F or Cl, P is a polymerizable group, Sp is a spacer group with 1 to 20 C atoms, n is 0 or 1, p is in each case independently 0, 1, 2 or 3, and r is in each case independently 0, 1, 2 or 4.

9. A photoisomerizable chiral compound according to claim 7, wherein at least one of $R^1$ and $R^2$ denotes P-Sp-, wherein
P is $CH_2=CW^1-COO-$,

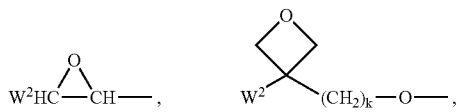

$CH_2=CW^2-O-$, $CH_3-CH=CH-O-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, Phe-CH=CH-, HOOC-, OCN- or $W^4W^5W^6Si-$, with $W^1$ being H, Cl, CN, phenyl or alkyl with 1 to 5 C-atoms, $CH_3$, $W^2$ and $W^3$ being independently of each other H or alkyl with 1 to 5 C-atoms, methyl, ethyl or n-propyl, $W^4$, $W^5$ $W^6$ being independently of each other Cl, oxaalkyl or oxacarbonylalkyl with A 1 to 5 C-atoms, Phe being 1,4-phenylene and k, $k_1$ and $k_2$ being independently of each other 0 or 1, and Sp is straight chain or branched alkylene having 1 to 20 C atoms, in which, in addition, one or more non-adjacent $CH_2$ groups may be replaced by $-O-$, $-S-$, $-NR^0-$, $-CO-$, $-O-CO-$, $-S-CO-$, $-O-COO-$, $-CO-S-$, $-CO-O-$, $-CH(halogen)-$, $-CH(CN)-$, $-CH(OH)-$, $-(CF_2)_x-$, $-(CD_2)_x-$, $-CH=CH-$, $-CF=CF-$, $-CH=CF-$ or $-C\equiv C-$, with x being an integer from 1 to 12, and in which one or more H atoms may be replaced by halogen, CN or OH.

10. A photoisomerizable chiral compound according to claim 7, wherein $B^1$ is COO and $B^2$ is OCO.

11. A photoisomerizable chiral compound according to claim 7, selected of the following formulae wherein $R^1$, $R^2$, Z, $A^1$, $A^2$, a and b have the meanings given in claim 9, and wherein $B^1$ is COO and $B^2$ is OCO.

12. A liquid crystalline mixture comprising at least one chiral photoisomerizable compound according to claim 1.

13. A liquid crystalline mixture according to claim 12 comprising at least one polymerizable compound, which can be a chiral compound of formula I or an additional polymerizable compound.

14. A linear or crosslinked anisotropic polymer obtainable by polymerizing a mixture according to claim 13.

15. An optical and electrooptical device, liquid crystal display, projection system, optical element, polarizer, retardation film, compensator, colour filter, holographic element, liquid crystal pigment, film colored coating, decorative or security application, cosmetic or pharmaceutical composition, nonlinear optics element, or optical information storage device comprising a compound according to claim 1 or a polymer obtainable by polymerizing a mixture comprising said compound.

16. A liquid crystal display comprising a compound according to claim 1.

17. A polymer film obtainable by coating a polymerizable mixture according to claim 13 comprising a chiral photoisomerizable compound of formula I onto a substrate, aligning the mixture into planar orientation, and polymerizing the mixture, wherein at least a part of the mixture before or during polymerization is exposed to actinic radiation of a wavelength where the chiral photoisomerizable compound shows photoisomerization, thereby changing its chirality.

18. A color filter or broadband reflective polarizer comprising a polymer film according to claim 17.

19. A liquid crystal display comprising a mixture according to claim 12.

20. A liquid crystal display comprising a polymer according to claim 14.

21. A photoisomerizable chiral compound according to claim 1, which comprises at least one photoisomerizable group and at least one mesogenic group.

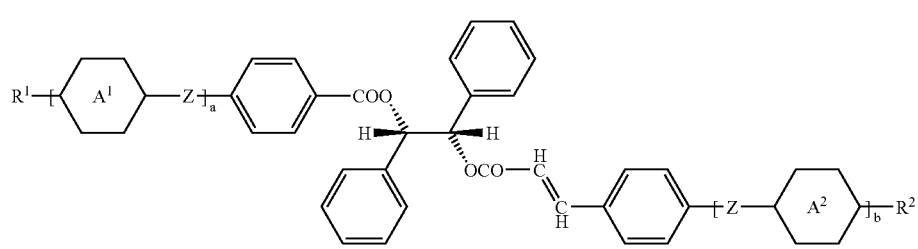

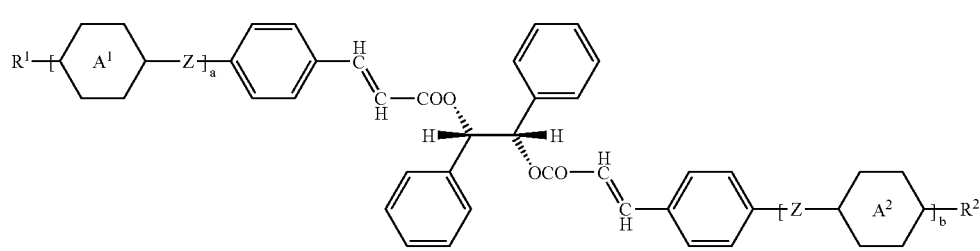

22. A photoisomerizable chiral compound according to claim 9, wherein B is —O—, —S—, —NR$^o$—, —O—CO—, —NR$^o$—CO—, —O—COO—, —OCH$_2$—, —S—CO—, —S—COO— or a single bond.

23. A photoisomerizable chiral compound according to claim 9, wherein B$^1$ and B$^2$ are, each independently, —O—, —S—, —NR$^o$—, —O—CO—, —NR$^o$—CO—, —O—COO—, —OCH$_2$—, —S—CO—, —S—COO— or a single bond.

* * * * *

UNITED STATES PATENT AND TRADEMARK OFFICE
CERTIFICATE OF CORRECTION

PATENT NO. : 7,122,227 B2  Page 1 of 1
APPLICATION NO. : 10/432015
DATED : October 17, 2006
INVENTOR(S) : Alison May It is certified that error appears in the above-identified patent and that said Letters Patent is hereby corrected as shown below:

On the front page, Inventors: line 4, reads "Christopher Dunn," should read -- Christopher J. Dunn, --
Column 43, line 26, reads "$X^4 \neq X^5 \neq X^6$ and" should read -- $X^4 \neq X^5 \neq X^6$, and --
Column 43, line 41, reads "-B-$(Sp)_n$-$(M^1-Z^1)$-$(PI)_k$-$(Z^2-M^2)_i$-R," should read -- -B-$(Sp)_n$-$(M^1-Z^1)_i$-$(PI)_k$-$(Z^2-M^2)_l$-R, --
Column 44, line 12-13, reads "-B-Sp-$(M^1-Z^1)_i$ -$(PI)_k$-$(Z^2-M^2)_i$-G," should read -- -B-Sp-$(M^1-Z^1)_i$ -$(PI)_k$-$(Z^2-M^2)_l$-G, --
Column 44, line 67, reads "selected of the" should read -- selected from the --
Column 46, line 26, reads "selected of the" should read -- selected from the --
Column 51, line 1, reads "$CH_2CF_2$-," should read -- -$CH_2CF_2$-, --
Column 51, line 28, reads "-B-(Sp)-G," should read -- -B-$(Sp)_n$-G, --
Column 51, line 29, reads "-B-$(Sp)_n$-$(M^1-Z^1)_i$-$(PI)_k$-$(Z^2-M^2)_i$-R," should read -- -B-$(Sp)_n$-$(M^1-Z^1)_i$-$(PI)_k$-$(Z^2-M^2)_l$-R, --
Column 51, line 46, reads "-C≡-" should read -- -C≡C- --
Column 51, line 54, reads "Ml and M2" should read -- $M^1$ and $M^2$ --
Column 51, line 58, reads "$R^5$ and R" should read -- $R^5$ and $R^6$ --
Column 52, line 14, reads "according to of" should read -- according to --
Column 52, line 15, reads "selected of the" should read -- selected from the --
Column 53, line 22-23, reads "$W^5$ $W^6$ being" should read -- $W^5$ and $W^6$ being --
Column 53, line 25, reads "A 1 to 5" should read -- 1 to 5 --
Column 53, line 40, reads "selected of the" should read -- selected from the --
Column 54, line 2, reads "claim 9," should read -- claim 7,--
Column 55, line 6, reads "claim 9," should read -- claim 7,--

Signed and Sealed this

Seventeenth Day of April, 2007

JON W. DUDAS
*Director of the United States Patent and Trademark Office*